United States Patent
Fujii

(10) Patent No.: US 7,489,118 B2
(45) Date of Patent: Feb. 10, 2009

(54) METHOD AND APPARATUS FOR HIGH-EFFICIENCY DC STABILIZED POWER SUPPLY CAPABLE OF EFFECTIVELY REDUCING NOISES AND RIPPLES

(75) Inventor: Tatsuya Fujii, Hyogo-ken (JP)

(73) Assignee: Ricoh Company, Ltd, Tokyo (JP)

( * ) Notice: Subject to any disclaimer, the term of this patent is extended or adjusted under 35 U.S.C. 154(b) by 910 days.

(21) Appl. No.: 10/360,102

(22) Filed: Feb. 6, 2003

(65) Prior Publication Data

US 2006/0273767 A1   Dec. 7, 2006

(30) Foreign Application Priority Data

Feb. 6, 2002   (JP) ............... 2002-029272

(51) Int. Cl.
 G05F 1/40 (2006.01)
 G05F 1/44 (2006.01)
 G05F 1/56 (2006.01)
(52) U.S. Cl. ............... 323/268; 323/270; 323/224; 323/226
(58) Field of Classification Search .......... 323/268, 323/270, 271, 282, 224, 226
 See application file for complete search history.

(56) References Cited

U.S. PATENT DOCUMENTS

| 5,016,207 A | | 5/1991 | Fujii et al. |
| 5,216,351 A | * | 6/1993 | Shimoda ............... 323/224 |
| 5,216,353 A | * | 6/1993 | Mori ............... 323/266 |
| 5,216,516 A | | 6/1993 | Tanaka et al. |
| 5,268,853 A | | 12/1993 | Tanaka et al. |
| 5,331,585 A | | 7/1994 | Tanaka et al. |
| 5,337,168 A | | 8/1994 | Fujii et al. |
| 5,341,468 A | | 8/1994 | Shiraishi et al. |
| 5,349,610 A | | 9/1994 | Sakamoto et al. |
| 5,359,549 A | | 10/1994 | Tanaka et al. |
| 5,396,585 A | | 3/1995 | Fujii et al. |

(Continued)

FOREIGN PATENT DOCUMENTS

JP   07-095765   4/1995

(Continued)

OTHER PUBLICATIONS

U.S. Appl. No. 08/102,050, filed Aug. 4, 1993.

(Continued)

Primary Examiner—Bao Q Vu
(74) Attorney, Agent, or Firm—Cooper & Dunham, LLP

(57) ABSTRACT

Methods and apparatuses for generating DC stabilized power are described. A DC stabilized power supply apparatus includes a voltage switching control circuit and first and second power supply circuits. The voltage switching control circuit generates first and second voltage switching signals in accordance with at least one voltage switching signal. The first power supply circuit converts a power source voltage into a first direct current voltage in accordance with the first voltage switching signal. The second power supply circuit converts the first direct current voltage into a second direct current voltage in accordance with the second voltage switching signal. In this apparatus, the voltage switching control circuit controls the first power supply circuit to generate the first direct current voltage such that the first direct current voltage is a minimal input voltage needed for the second power supply circuit to generate the second direct current voltage.

24 Claims, 21 Drawing Sheets

U.S. PATENT DOCUMENTS

| | | | |
|---|---|---|---|
| 5,448,690 | A | 9/1995 | Shiraishi et al. |
| 5,455,900 | A | 10/1995 | Shiraishi et al. |
| 5,459,822 | A | 10/1995 | Izawa et al. |
| 5,465,371 | A | 11/1995 | Fujii et al. |
| 5,551,019 | A | 8/1996 | Izawa et al. |
| 5,592,072 | A * | 1/1997 | Brown ................ 323/268 |
| 5,732,204 | A | 3/1998 | Fukushima et al. |
| 5,739,826 | A | 4/1998 | Shiraishi et al. |
| 6,140,714 | A | 10/2000 | Fujii |
| 6,191,567 | B1 | 2/2001 | Sluijs |
| 6,404,076 | B1 * | 6/2002 | Matsuda et al. ............ 307/80 |
| 6,424,128 | B1 * | 7/2002 | Hiraki et al. ............ 323/268 |
| 6,566,766 | B2 * | 5/2003 | Matsuda et al. ............ 307/82 |
| 6,667,603 | B2 * | 12/2003 | Hiraki et al. ............ 323/268 |
| 6,737,839 | B2 * | 5/2004 | Hiraki et al. ............ 323/268 |
| 6,798,179 | B2 * | 9/2004 | Nakajima ............ 323/277 |
| 6,836,417 | B2 * | 12/2004 | Hiraki et al. ............ 323/268 |

FOREIGN PATENT DOCUMENTS

| | | |
|---|---|---|
| JP | H11-32445 | 2/1999 |
| JP | H11-150952 | 6/1999 |
| JP | H11-262251 | 9/1999 |
| JP | 2002-543757 | 12/2002 |

OTHER PUBLICATIONS

U.S. Appl. No. 10/107,466, filed Mar. 26, 2002.

Mar. 1, 2005 Japanese official action in connection with corresponding Japanese application No. 2002-029272.

* cited by examiner

METHOD AND APPARATUS FOR HIGH-EFFICIENCY DC STABILIZED POWER SUPPLY CAPABLE OF EFFECTIVELY REDUCING NOISES AND RIPPLES

BACKGROUND

1. Field

This patent specification describes a method and apparatus for a high-efficiency DC stabilized power supply, and more particularly a method and apparatus for a high-efficiency DC stabilized power supply capable of reducing electrical noises and ripples by effectively controlling an output voltage of a switching regulator.

2. Discussion of the Background

Background DC (direct current) stabilized power supply apparatuses commonly used generally include two typical switching regulators, one having a high efficiency but producing a ripple on an output electric voltage and large operational noises and the other having a low efficiency producing a less ripple and low operational noises. In order to attempt to provide a DC stabilized power supply apparatus producing a less ripple, a power source voltage derived from a DC power source is applied to a switching regulator and the switching regulator generates an output voltage required as an input voltage. Then, the output voltage generated by the switching regulator is input to a series regulator and the series regulator generates a desired output voltage to be provided to a load circuit. Thus, it is possible to provide a DC stabilized power supply apparatus capable of efficiently using characteristics of the switching regulator and the series regulator to minimize a loss of electric power by the series regulator while reducing ripples.

Japanese Laid-Open Patent Application Publication, No. 07-095765, describes a DC stabilized power supply apparatus having a structure using the above-described structural concept. The structure of this DC stabilized power supply apparatus is shown in FIG. 1. In FIG. 1, reference numeral 200 denotes the DC stabilized power supply apparatus which includes a switching regulator 201 and a series regulator 202. In the switching regulator 201, an output voltage VoA is divided with resistors Ra and Rb. Then, a difference between the divided voltage and a predetermined reference voltage Vr supplied from a reference voltage generator 203 is amplified with an error amplifier Aa. After that, a voltage of an output signal from the comparator Aa and an output signal from an oscillating circuit 204 for generating a triangular pulse signal are compared by a comparator Ab. The comparator Ab controls the operation of a base current amplifying transistor Qc in accordance with the comparison result so as to control an on-time of a switching transistor Qa.

The signal output from the switching transistor Qa is smoothed through a smoothing circuit which includes a diode Da, an electric coil La, and a capacitor Ca, and becomes the output voltage VoA to be input to the series regulator 202. The output voltage VoA from the switching regulator 201 is set to be a sum voltage of the output voltage VoB from the series regulator 202 and a voltage Vce between the collector and the emitter of an output control transistor Qc of the series regulator 202 by adjusting the resistors Ra and Rb.

In the series regulator 202, the output voltage VoB is divided with resistors Rc and Rd. Then, a difference between the divided voltage and the predetermined reference voltage Vr supplied from the reference voltage generator 203 is amplified with an error amplifier Ac. The error amplifier Ac controls the operation of a base current amplifying transistor Qd to control the operation of a switching transistor Qc so that the output voltage VoB becomes constant. As shown in FIG. 1, the reference voltage generator 203 is shared by the switching regulator 201 and the series regulator 202.

In this way, the switching regulator 201 adds the output voltage VoA, including the required collector-emitter voltage Vce of the output control transistor Qc and a minimal marginal voltage, to the output voltage VoB so that the loss of power by the series regulator 202 can be minimized. This improves, at the same time, the entire efficiency of the DC stabilized power supply apparatus 200 while producing a constant voltage with less noise and ripple.

In recent years, electronic equipment has been provided with plural functions which, however, generally will not be operated at the same time and only necessary functions are activated depending upon the operational conditions of the equipment. Each of the electrical circuits of the electronic equipment performing these functions is generally designed to be applied with an optimal electric power voltage. Therefore, the electronic equipment is required to switch the electric power voltages frequently in accordance with the operational conditions. Thus, it becomes possible to make the electronic equipment environmentally friendly, and operable with a less electric power.

In addition, in a portable information handling apparatus using batteries, such as a cellular phone, a mobile personal information terminal, a laptop PC, and so forth, a reduction of power consumption is important to make the batteries last longer. Therefore, a technique for switching the electric power voltages suitably for each of the circuits becomes more and more important.

However, no particular attention to the technique for switching the electric power voltages, as described above, is invested in the structure of the DC stabilized power supply apparatus described in Japanese Laid-Open Patent Application Publication, No. 07-095765. If the output voltage, e.g., the reference voltage Vr of FIG. 1, is forcedly changed, the output voltage VoB of the series regulator 202 which is the final output voltage is greatly deviated due to a difference in response time between the switching regulator and the series regulator. As a result, a load circuit 211 connected to the series regulator 202 may be forced to break off its operation, or may suffer damage.

Furthermore, since the collector-emitter voltage Vce required for the output control transistor Qc of the series regulator 202 is changed in accordance with the output voltage of the series regulator 202 and a current amount flowing through the load circuit 211, it is needed to adjust the output voltage of the switching regulator 201 to cope with these deviation factors. However, in the circuit shown in Japanese Laid-Open Patent Application Publication, No. 07-095765, the output voltage of the switching regulator 201 is determined by the resistors Ra and Rb and cannot be changed in an arbitrary fashion.

SUMMARY

This patent specification describes a novel DC stabilized power supply apparatus which reduces electrical noises and ripples by effectively controlling an output voltage of a switching regulator. In one example, a novel DC stabilized power supply apparatus includes a voltage switching control circuit, a first power supply circuit, and a second power supply circuit. The voltage switching control circuit is configured to generate first and second voltage switching signals in accordance with at least one voltage switching signal externally input thereto. The first power supply circuit is configured to convert a power source voltage derived from a direct current power source into a first direct current voltage in accordance with the first voltage switching signal generated by the voltage switching control circuit. The second power supply circuit is configured to convert the first direct current voltage converted by the first power supply circuit into a second direct current voltage in accordance with the second voltage switching signal generated by the voltage switching control circuit. In the-thus structured novel DC stabilized power supply apparatus, the voltage switching control circuit controls the first power supply circuit to generate the first direct current voltage such that the first direct current voltage is a minimal input voltage needed for the second power supply circuit to generate the second direct current voltage.

The voltage switching control circuit may control the second power supply circuit to reduce the second direct current voltage to a first specific voltage and subsequently controls the first power supply circuit to reduce the first direct current voltage to a voltage corresponding to the first specific voltage, upon a receipt of the at least one voltage switching signal externally input such that the second direct current voltage is reduced to the first specific voltage.

The voltage switching control circuit may control the second power supply circuit to increase the second direct current voltage to a second specific voltage and subsequently controls the first power supply circuit to increase the first direct current voltage to a voltage corresponding to the second specific voltage, upon a receipt of the at least one voltage switching signal externally input such that the second direct current voltage is increased to the second specific voltage.

The voltage switching control circuit may include a controller, a first delay circuit, and a second delay circuits. The controller is configured to generate first and second control signals in accordance with the at least one voltage switching signal externally input thereto. The first delay circuit is configured to delay the at least one voltage switching signal by a first delay time period in accordance with the first control signal generated by the controller and to output a resultant delayed signal as the first voltage switching signal. The second delay circuit is configured to delay the at least one voltage switching signal by a second delay time period in accordance with the second control signal generated by the controller and to output a resultant delayed signal as the second voltage switching signal.

The controller may control the second delay circuit to output the at least one voltage switching signal as a second voltage switching signal and controls the first delay circuit to delay the at least one voltage switching signal by the first delay time period and to output a resultant signal as the first voltage switching signal, upon a receipt of the at least one voltage switching signal input thereto such that the second direct current voltage is reduced to a first voltage.

The controller may control the first delay circuit to output the at least one voltage switching signal as a first voltage switching signal and controls the second delay circuit to delay the at least one voltage switching signal by the second delay time period and to output a resultant signal as the second voltage switching signal, upon a receipt of the at least one voltage. switching signal input thereto such that the second direct current voltage is increased to a second voltage.

This patent specification describes another novel DC stabilized power supply apparatus which reduces electrical noises and ripples by effectively controlling an output voltage of a switching regulator. In one example, a novel DC stabilized power supply apparatus includes a voltage switching control circuit, a first power supply circuit, at least two second power supply circuits. The voltage switching control circuit is configured to generate first voltage switching signal and at least two voltage switching signals in accordance with at least one voltage switching signal externally input thereto. The first power supply circuit is configured to convert a power source voltage derived from a direct current power source into a first direct current voltage in accordance with the first voltage switching signal generated by the voltage switching control circuit. The above-mentioned at least two second power supply circuits are configured to convert the first direct current voltage converted by the first power supply circuit into respectively corresponding at least two second direct current voltages in accordance with the at least two second voltage switching signals correspondingly input thereto from the voltage switching control circuit. In the-thus structured novel DC stabilized power supply apparatus, the voltage switching control circuit controls the first power supply circuit to generate the first direct current voltage such that the first direct current voltage is a minimal input voltage needed for each of the at least two second power supply circuits to generate the corresponding one of the at least two second direct current voltages.

The voltage switching control circuit may control the at least two second power supply circuits to reduce the at least two second direct current voltages to corresponding first specific voltages and subsequently controls the first power supply circuit to reduce the first direct current voltage to a predetermined voltage, upon a receipt of the at least one voltage switching signal externally input such that the at least two second direct current voltages are reduced to the corresponding first specific voltages.

The voltage switching control circuit may control the first power supply circuit to increase the first direct current voltage to a predetermined voltage and subsequently controls the at least two second power supply circuits to increase the at least two second direct current voltages to corresponding second specific voltages, upon a receipt of the at least one voltage switching signal externally input such that the at least two second direct current voltages are increased to the corresponding second specific voltages.

The voltage switching control circuit may include a controller and first and second delay circuit. The controller is configured to generate a first control signal and at least two second control signals in accordance with the at least one voltage switching signal externally input thereto. The a first delay circuit is configured to delay the at least one voltage switching signal by a first delay time period in accordance with the first control signal generated by the controller and to output a resultant delayed signal as the first voltage switching signal. The above-mentioned at least two second delay circuits is configured to delay the at least one voltage switching signal by corresponding second delay time periods in accordance with the respective of the at least two second control signals generated by the controller and to output resultant delayed signals as the at least two second voltage switching signals.

The controller may control the at least two second delay circuits to output the at least one voltage switching signal as the respective of the at least two second voltage switching signals and controls the first delay circuit to delay the at least one voltage switching signal by the first delay time period and to output a resultant delayed signal as the first voltage switching signal, upon a receipt of the at least one voltage switching signal input thereto such that the at least two second direct current voltages are reduced to corresponding first voltages.

The controller may control the first delay circuit to output the at least one voltage switching signal as the first voltage switching signal and controls the at least two second delay circuits to delay the at least one voltage switching signal by the corresponding delay time periods and to output resultant delayed signals as the at least two second voltage switching signals, upon a receipt of the at least one voltage switching signal input thereto such that the at least two second direct current voltages are increased to corresponding second voltages.

This patent specification further describes another novel DC stabilized power supply apparatus which reduces electrical noises and ripples by effectively controlling an output voltage of a switching regulator. In one example, a novel DC stabilized power supply apparatus includes a voltage switching control circuit, first and second power supply circuits, and first and second delay circuits. The voltage switching control circuit is configured to generate first and second voltage switching signals in accordance with at least one voltage switching signal externally input thereto. The first power supply circuit is configured to convert a power source voltage derived from a direct current power source into a first direct current voltage in accordance with the first voltage switching signal generated by the voltage switching control circuit. The second power supply circuit is configured to convert the first direct current voltage converted by the first power supply circuit into a second direct current voltage in accordance with the second voltage switching signal generated by the voltage switching control circuit. The first voltage detection circuit is configured to detect a voltage of the first direct current voltage in response to the first voltage switching signal generated by the voltage switching control circuit and to output a detection result to the voltage switching control circuit. The second voltage detection circuit is configured to detect a voltage of the second direct current voltage in response to the second voltage switching signal generated by the voltage switching control circuit and to output a detection result to the voltage switching control circuit. In the thus-structured DC stabilized power supply apparatus, the voltage switching control circuit controls the first power supply circuit to generate the first direct current voltage such that the first direct current voltage is a minimal input voltage needed for the second power supply circuit to generate the second direct current voltage.

The voltage switching control circuit may control the second power supply circuit to reduce the second direct current voltage to a first arbitrary voltage and, when the second direct current voltage is detected as being reduced to the first arbitrary voltage based on the detection result from the second voltage detection circuit, the voltage switching control circuit controls the first power supply circuit to reduce the first direct current voltage to a voltage corresponding to the first arbitrary voltage, upon a receipt of the at least one voltage switching signal externally input such that the second direct current voltage is reduced to the first arbitrary voltage.

The voltage switching control circuit may control the first power supply circuit to increase the first direct current voltage to a voltage corresponding to a second arbitrary voltage and, when the first direct current voltage is detected as being increased to the voltage corresponding to the second arbitrary voltage based on the detection result from the first voltage detection circuit, the voltage switching control circuit controls the second power supply circuit to increase the second direct current voltage to a voltage corresponding to the second arbitrary voltage, upon a receipt of the at least one voltage switching signal externally input such that the second direct current voltage is increased to the second arbitrary voltage.

This patent specification further describes another novel DC stabilized power supply apparatus which reduces electrical noises and ripples by effectively controlling an output voltage of a switching regulator. In one example, a novel DC stabilized power supply apparatus includes a voltage switching control circuit, first and second power supply circuits, and first and second delay circuits. The voltage switching control circuit is configured to generate first voltage switching signal and at least two voltage switching signals in accordance with at least one voltage switching signal externally input thereto. The first power supply circuit is configured to convert a power source voltage derived from a direct current power source into a first direct current voltage in accordance with the first voltage switching signal generated by the voltage switching control circuit. The above-mentioned at least two second power supply circuits are configured to convert the first direct current voltage converted by the first power supply circuit into respectively corresponding at least two second direct current voltages in accordance with the at least two second voltage switching signals correspondingly input thereto from the voltage switching control circuit. The first voltage detection circuit is configured to detect a voltage of the first direct current voltage in response to the first voltage switching signal generated by the voltage switching control circuit and to output a detection result to the voltage switching control circuit. The above-mentioned at least two second voltage detection circuits are configured to detect respective voltages of the at least two second direct current voltages in response to the at least two second voltage switching signals correspondingly generated by the voltage switching control circuit and to output respective detection results to the voltage switching control circuit. In the-thus structured DC stabilized power supply apparatus, the voltage switching control circuit controls the first power supply circuit to generate the first direct current voltage such that the first direct current voltage is a minimal input voltage needed for each of the at least two second power supply circuits to generate the corresponding one of the at least two second direct current voltages.

The voltage switching control circuit may control the at least two second power supply circuits to reduce the at least two second direct current voltages to corresponding first arbitrary voltages and, when the at least two second direct current voltages are detected as being reduced to the corresponding first arbitrary voltages based on the detection results from the at least two second voltage detection circuits, the voltage switching control circuit controls the first power supply circuit to reduce the first direct current voltage to a predetermined voltage, upon a receipt of the at least one voltage switching signal externally input such that the at least two second direct current voltages are reduced to the corresponding first arbitrary voltages.

The voltage switching control circuit may control the first power supply circuit to increase the first direct current voltage to a predetermined voltage and, when the first direct current voltage is detected as being increased to the predetermined voltage based on the detection result from the first voltage detection circuit, the voltage switching control circuit controls the at least two second power supply circuits to increase the at least two second direct current voltages to corresponding second specific voltages, upon a receipt of the at least one voltage switching signal externally input such that the at least two second direct current voltages are increased to the corresponding second arbitrary voltages.

The first power supply circuit may include a switching regulator and the second power supply circuit includes a series regulator.

This patent specification further describes a novel method of generating DC stabilized power which reduces electrical noises and ripples by effectively controlling an output voltage of a switching regulator. In one example, a novel DC stabilized power supply apparatus includes the steps of making, generating, and producing. The making step makes first and second voltage switching signals in accordance with at least one voltage switching signal externally input. The generating step generates a first direct current voltage based on a power source voltage derived from a direct current power source in accordance with the first voltage switching signal. The producing step produces a second direct current voltage based on the first direct current voltage in accordance with the second voltage switching signal. In this method, the first direct current voltage is a minimal input voltage needed for the producing step to produce the second direct current voltage.

When the at least one voltage switching signal is externally input such that the second direct current voltage is reduced to a first specific voltage, the producing step may reduce the second direct current voltage to the first specific voltage and subsequently the generating step reduces the first direct current voltage to a voltage corresponding to the first specific voltage.

When the at least one voltage switching signal is externally input such that the second direct current voltage is increased to a second specific voltage, the producing step may increase the second direct current voltage to the second specific voltage and subsequently the generating step increases the first direct current voltage to a voltage corresponding to the second specific voltage.

The making step includes the sub-steps of creating and first and second delaying. The creating step creates first and second control signals in accordance with the at least one voltage switching signal. The first delaying step delays the at least one voltage switching signal by a first delay time period in accordance with the first control signal to output a resultant delayed signal as the first voltage switching signal. The second delaying step delays the at least one voltage switching signal by a second delay time period in accordance with the second control signal to output a resultant delayed signal as the second voltage switching signal.

When the at least one voltage switching signal is input such that the second direct current voltage is reduced to a first voltage, the second delaying step may output the at least one voltage switching signal as a second voltage switching signal and the first delaying step delays the at least one voltage switching signal by the first delay time period and outputs a resultant signal as the first voltage switching signal.

When the at least one voltage switching signal is input such that the second direct current voltage is increased to a second voltage, the first delaying step may output the at least one voltage switching signal as a first voltage switching signal and the second delaying step delays the at least one voltage switching signal by the second delay time period and outputs a resultant signal as the second voltage switching signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 2:
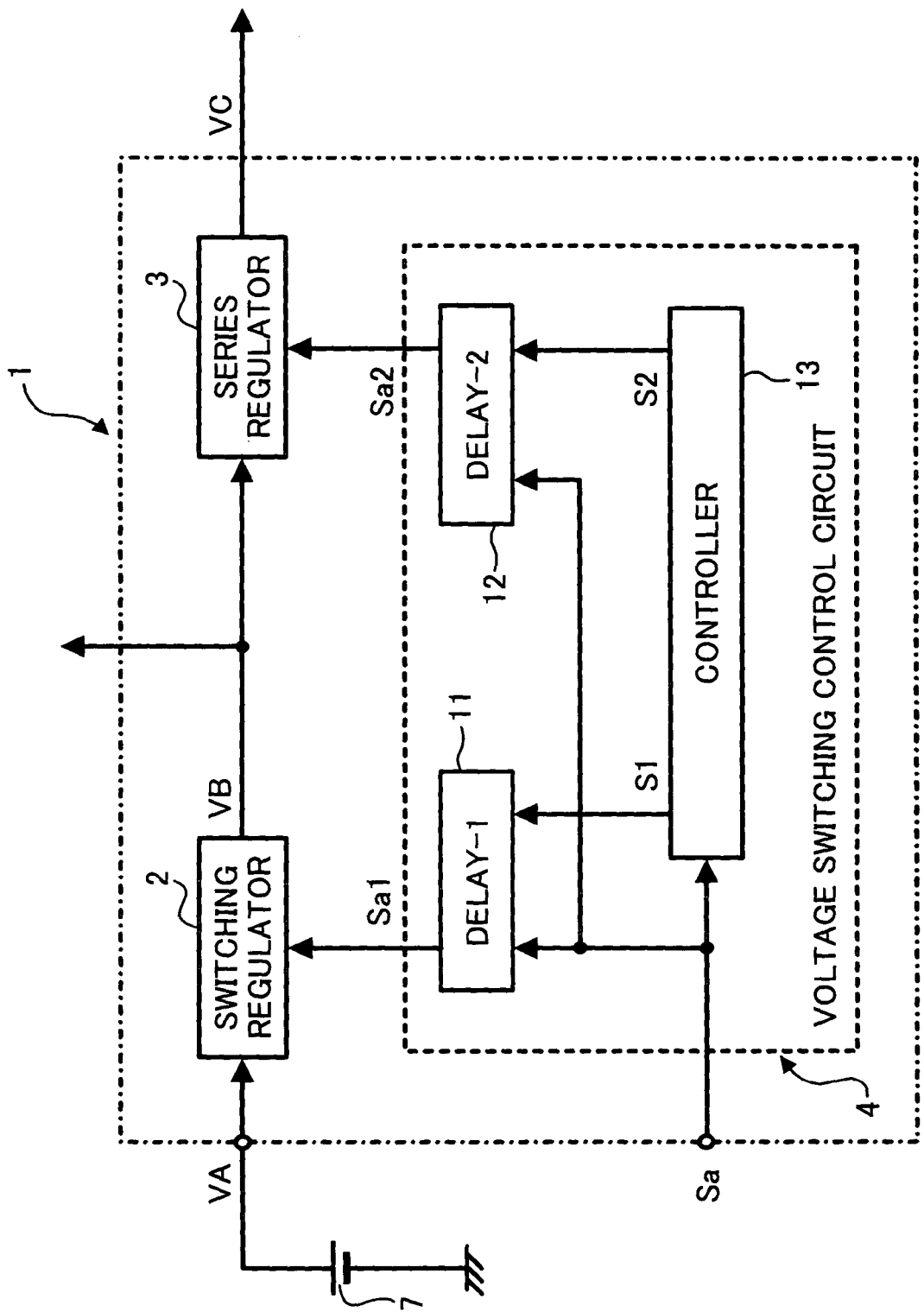
FIG. 2 is a schematic diagram of a DC stabilized power supply apparatus according to a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding pans throughout the several views, particularly to FIG. 2, a DC (direct current) stabilized power supply apparatus 1 according to a preferred embodiment is illustrated. As shown in FIG. 2, the DC stabilized power supply apparatus 1 includes a switching regulator 2, a series regulator 3, and a voltage switching control circuit 4. The switching regulator 2 switches its output voltages in accordance with control signals input thereto. The series regulator 3 switches its output voltages in accordance with control signals input thereto. The voltage switching control circuit 4 controls a time to output an external voltage switching signal Sa to the switching regulator 2 and the series regulator 3. The external voltage switching signal Sa is a signal for switching arbitrarily an output voltage VC of the series regulator.

The switching regulator 2 derives a power voltage VA as power from a DC (direct current) power supply 7 (e.g., a battery) and generates an output voltage VB based on the power voltage VA and in accordance with the voltage switching signal Sa. The series regulator 3 receives the output voltage VB from the switching regulator 2 and generates the output voltage VC based on the voltage VB and in accordance with the voltage switching signal Sa.

The voltage switching control circuit 4 includes a first delay circuit (DELAY-1) 11 and a second delay circuit (DELAY-2) 12, and a controller 13. The first delay circuit 11 delays the voltage switching signal Sa by a delay time T1, and sends a delayed voltage switching signal Sa1 to the switching regulator 2. The second delay circuit 12 delays the voltage switching signal Sa by a delay time T2, and sends a delayed voltage switching signal Sa2 to the series regulator 3. The controller 13 sends a control signal S1 to the first delay circuit 11 and a control signal S2 to the second delay circuit 12, in accordance with the voltage switching signal Sa. The first delay circuit 11 outputs the delayed voltage switching signal Sa1 based on the voltage switching signal Sa to the switching regulator 2, in response to the control signal S1 input. The second delay circuit 12 outputs the delayed voltage switching signal Sa2 based on the voltage switching signal Sa to the series regulator 3, in response to the control signal S2.

The controller 13 causes the first delay circuit 11 to send the voltage switching signal Sa1, generated by delaying the voltage switching signal Sa, to the switching regulator 2 and also causes the second delay circuit 12 to send the voltage switching signal Sa as the voltage switching signal Sa2 to the series regulator 3, upon receiving the voltage switching signal Sa such that the output voltage VC is reduced to a predetermined value A. Further, upon receiving the voltage switching signal Sa such that the output voltage VC is reduced to a predetermined value C, the controller 13 controls the first delay circuit 11 to send the voltage switching signal Sa as the voltage switching signal Sa1 to the switching regulator 2 and also controls the second delay circuit 12 to send the voltage switching signal Sa2, generated by delaying the voltage switching signal Sa, to the series regulator 3.

Figure 3:
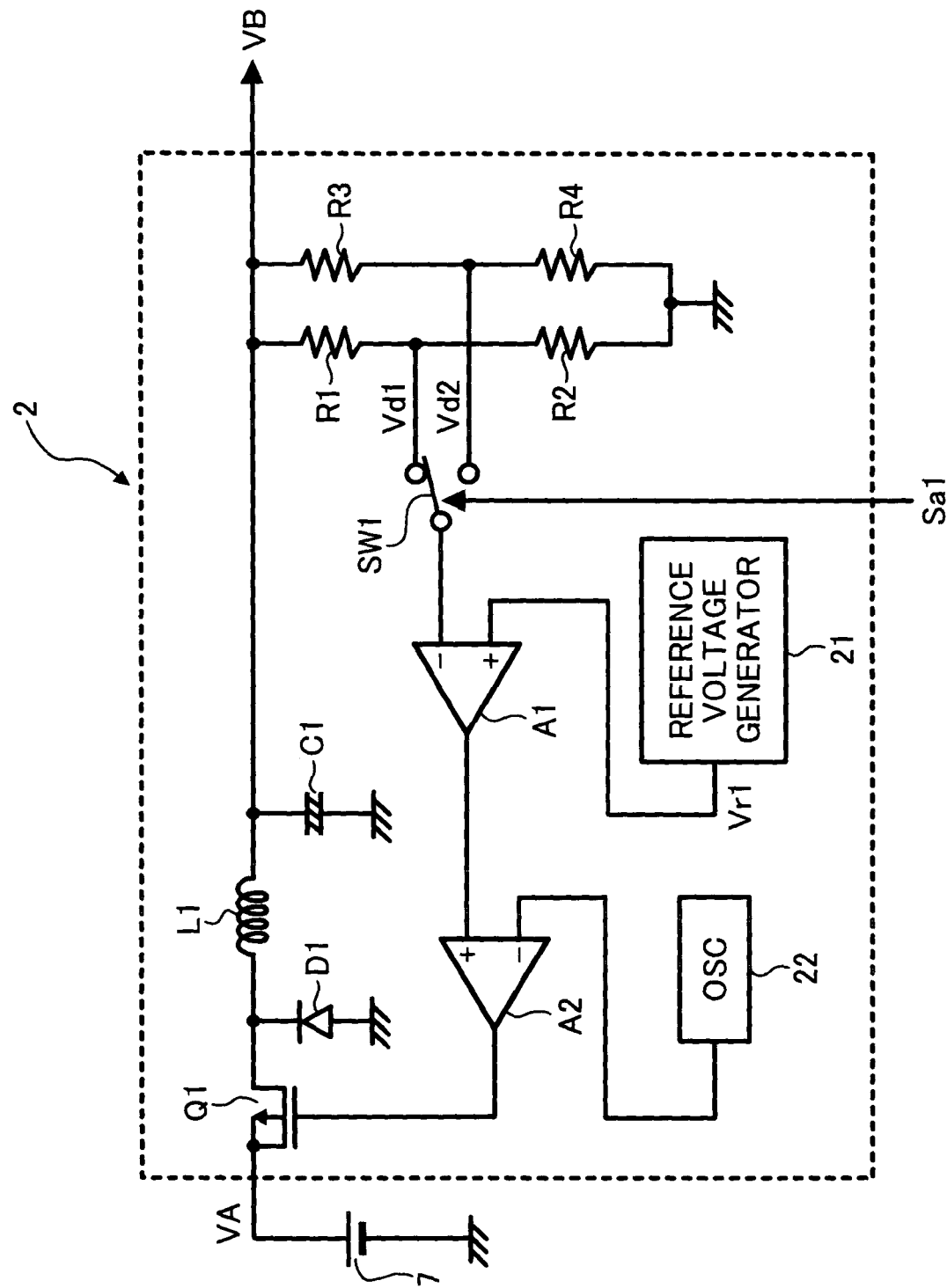
FIG. 3 is a schematic diagram of a switching regulator of the DC stabilized power supply apparatus of FIG. 2.

Referring to FIG. 3, an exemplary structure of the switching regulator 2 is explained. The switching regulator 2 divides the output voltage VB with resistors R1 and R2 or with resistors R3 and R4, and causes an error amplifier A1 to amplify a voltage difference between the divided voltage and a reference voltage Vr1 generated by a reference voltage generator 21. Further, the switching regulator 2 causes a comparator A2 to compare an output voltage signal from the error amplifier A1 with a voltage of a chopping wave signal output from an oscillator (OSC) 22. The comparator A2 controls a time period that a switching transistor Q1 is turned on, in accordance with the comparison result.

The switching transistor Q1 outputs a signal to a diode D1, an electric coil L1, and a capacitor C1 which smooth the signal from the switching transistor Q1. Then, the smoothed signal is transferred as the output voltage VB to the series regulator 3. A switch SW1 selects one of a divided voltage Vd1 between the resistors R1 and R2 and a divided voltage Vd2 between the resistors R3 and R4 in accordance with the voltage switching signal Sa1 sent from the first delay circuit 11, and transfers the selected divided voltage to an inverse input terminal of the error amplifier A1. For example, when the divided voltage Vd1 is smaller than the divided voltage Vd2, the switch SW1 selects the divided voltage Vd2 and transfers it to the error amplifier A1 upon a rise of the voltage switching signal Sa1 to a high level. Accordingly, the output voltage VB is reduced. Upon a fall of the voltage switching signal Sa1 to a low level, the switch SW1 selects the divided voltage Vd1 and transfers it to the error amplifier A1. Accordingly, the output voltage VB is increased.

Figure 4:
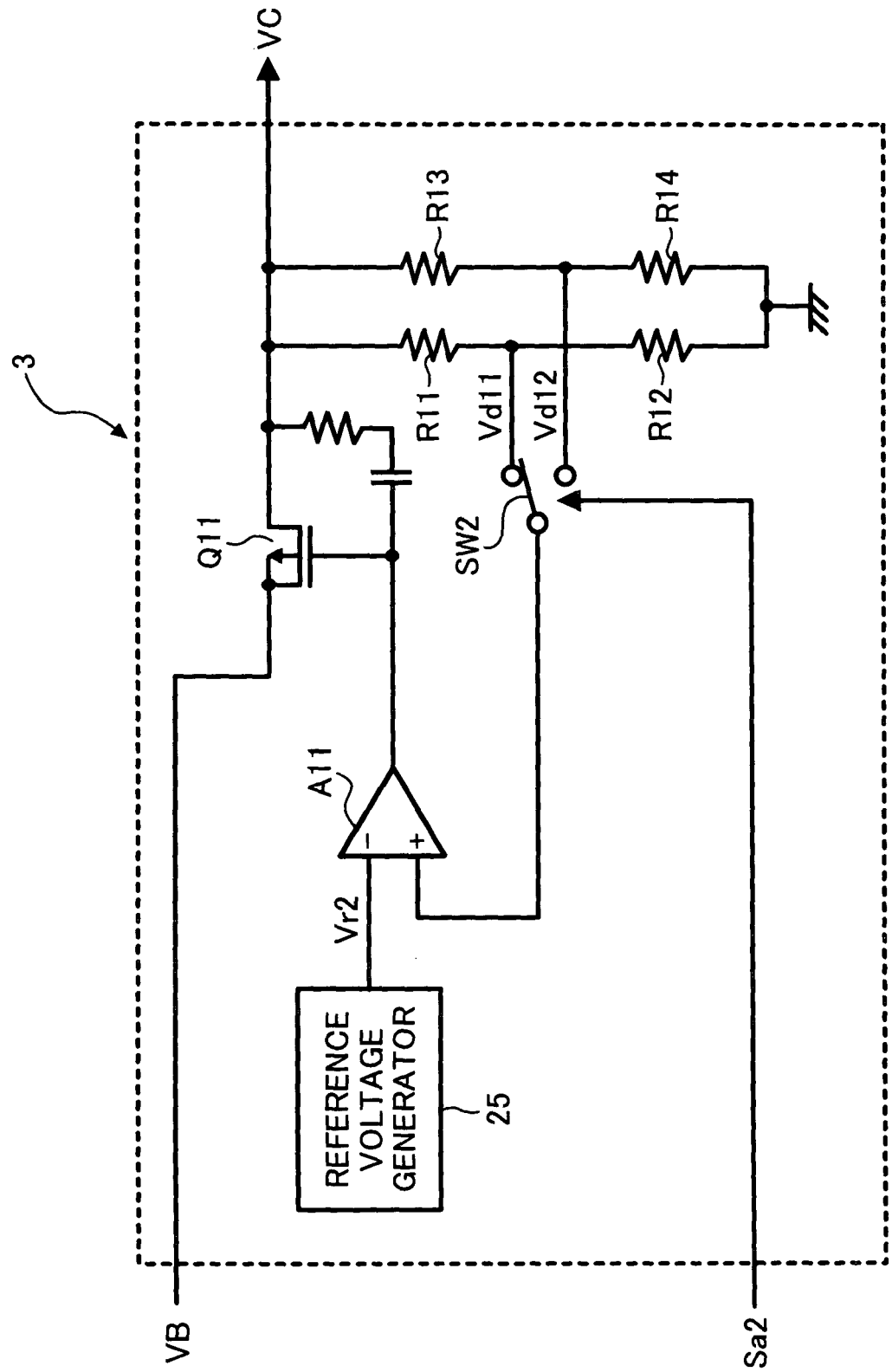
FIG. 4 is a schematic diagram of a series regulator of the DC stabilized power supply apparatus of FIG. 2.

Referring to FIG. 4, an exemplary structure of the series regulator 3 is explained. The series regulator 3 divides the output voltage VC with resistors R11 and R12 or with resistors R13 and R14, and causes an error amplifier A11 to amplify a voltage difference between the divided voltage and a reference voltage Vr2 generated by a reference voltage generator 25. The error amplifier A11 controls operations of an output control transistor Q11 to regulate the output voltage VC at a desired constant level.

A switch SW2 selects one of a divided voltage Vd11 between the resistors R11 and R12 and a divided voltage Vd12 between the resistors R13 and R14 in accordance with the voltage switching signal Sa2 sent from the second delay circuit 12, and transfers the selected divided voltage to a non-inverse input terminal of the error amplifier A11. For example, when the divided voltage Vd11 is smaller than the divided voltage Vd12, the switch SW2 selects the divided voltage Vd12 and transfers it to the error amplifier A11 upon a rise of the voltage switching signal Sa2 to a high level. Accordingly, the output voltage VB is reduced. Upon a fall of the voltage switching signal Sa2 to a low level, the switch SW2 selects the divided voltage Vd11 and transfers it to the error amplifier A11. Accordingly, the output voltage VB is increased. The above-mentioned output control transistor Q11 may preferably be a low saturation voltage type transistor called an LDO (low drop out).

The output voltage VB from the switching regulator 2 has a value such that a voltage Vds required between the drain and the source of the output control transistor Q11 is added with a minimum margin. For example, when the output voltage VC of the series regulator 3 is 2 volts, for example, and a saturation voltage of the output control transistor Q11 is 0.15 volts, for example, the switching regulator 2 is controlled to output a voltage of 2.2 volts, for example, which includes an addition of a margin of 0.05 volts, for example.

Figure 5:
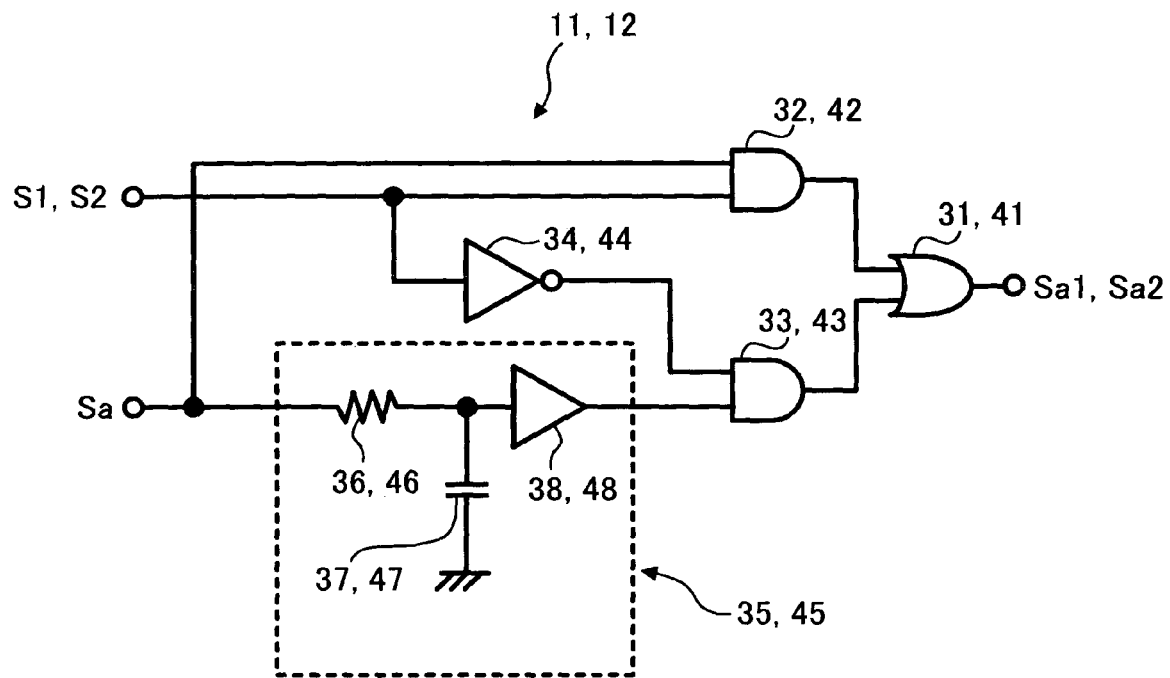
FIGS. 5 and 6 are schematic diagrams of exemplary first and second delay circuits of the DC stabilized power supply apparatus of FIG. 2.

Referring to FIG. 5, details of the first and second delay circuits 11 and 12 are explained. Since the first and second delay circuits 11 and 12 are provided with exemplary structures which can be identical to each other, the discussion below uses a circuit diagram of an exemplary common circuit, as is shown in FIG. 5, with two reference numerals for the first and second delay circuits 11 and 12, respectively.

As shown in FIG. 5, the first delay circuit 11 includes an OR gate 31, AND gates 32 and 33, an inverter 34, and a delay circuit 35. The delay circuit 35 includes a resistor 36, a capacitor 37, and a buffer circuit 38. The second delay circuit 12 includes an OR gate 41, AND gates 42 and 43, an inverter 44, and a delay circuit 45. The delay circuit 45 includes a resistor 46, a capacitor 47, and a buffer circuit 48.

In the first delay circuit 11, the control signal S1 from the controller 13 is input to one input terminal of the AND gate 32 and to one input terminal of the AND gate 33 via the inverter 34. The voltage switching signal Sa is input to the other input terminal of the AND gate 32 and to the other input terminal of the AND gate 33 through the delay circuit 35. In the delay circuit 35, the voltage switching signal Sa is delayed by a time period in response to a time constant of the resistor 36 and the capacitor 37 and is output through the buffer circuit 38 to the AND gate 33. The output signals from the AND gates 32 and 33 are input to the corresponding input terminals of the OR gate 31, and the output signal of the OR gate 31 becomes the voltage switching signal Sa1.

In the first delay circuit 11 having the above-described structure, upon receiving the control signal S1 at a high level, for example, the AND gate 32 outputs the voltage switching signal Sa and the output terminal of the AND gate 33 falls to a low level. As a consequence, the OR gate 31 outputs the voltage switching signal Sa as the voltage switching signal Sa1. When the control signal S1 at a low level is input, the output terminal of the AND gate 32 falls to a low level and the AND gate 33 outputs the delayed signal generated by the delay circuit 35 by delaying the voltage switching signal Sa. As a consequence, the OR gate 31 outputs the delayed signal as the voltage switching signal Sa1.

The second delay circuit 12 has an exemplary structure identical with that of the first delay circuit 11, as described above. Accordingly, the second delay circuit 12 performs its operation in a manner similar to that of the first delay circuit 11. For the sake of simplicity, an explanation of the structure and operation associated with the second delay circuit 12 is omitted since it can be referred to the description above for the structure and operation with respect to the first delay circuit 11.

Figure 6:
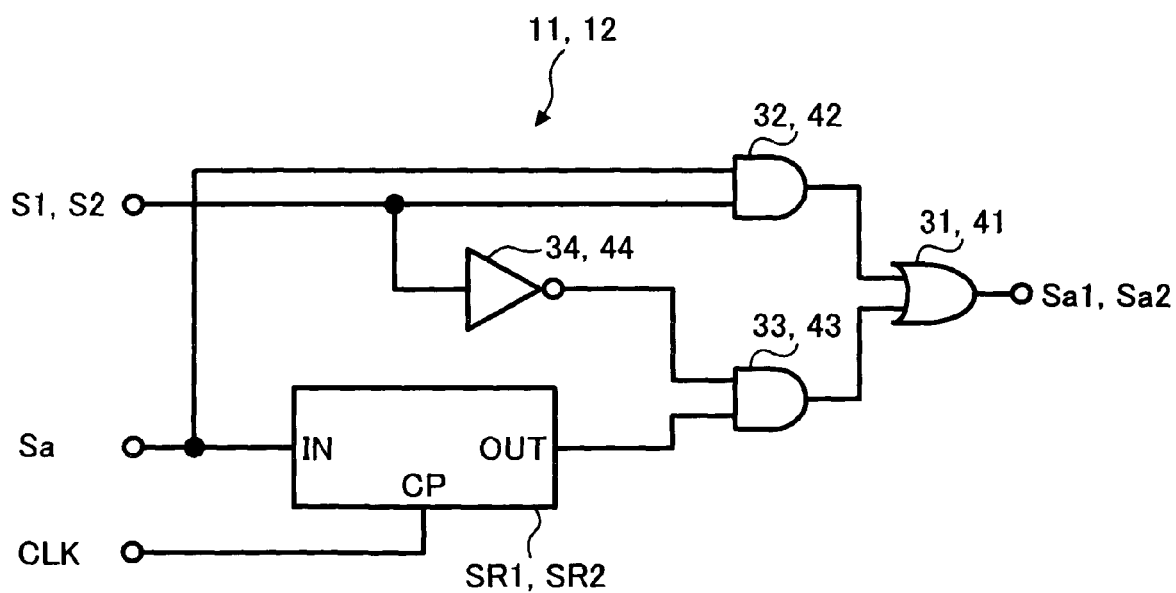

Alternatively, the delay circuits 35 and 45 included in the first and second delay circuits 11 and 12, respectively, can be replaced by shift registers SR1 and SR2, respectively, as shown in FIG. 6. In FIG. 6, when the voltage switching signal Sa is input to an input terminal IN of the shift register SR1, for example, the shift register SR1 delays the voltage switching signal Sa by the delay time T1 which is, in this case, determined by a number of shift stages and a frequency of a reference clock signal CLK, and outputs the delayed voltage switching signal from an output terminal OUT thereof. Likewise, when the voltage switching signal Sa is input to an input terminal IN of the shift register SR2, for example, the shift register SR2 delays the voltage switching signal Sa by the delay time T2 which is, in this case, determined by a number of shift stages and a frequency of a reference clock signal CLK, and outputs the delayed voltage switching signal from an output terminal OUT thereof.

Other operations of the first and second delay circuits 11 and 12 with the shift registers SR1 and SR2, respectively, are similar to those described with reference to FIG. 5.

As a further alternative, the shift registers SR1 and SR2 of FIG. 6 may be replaced by a counter circuit.

Figure 7:
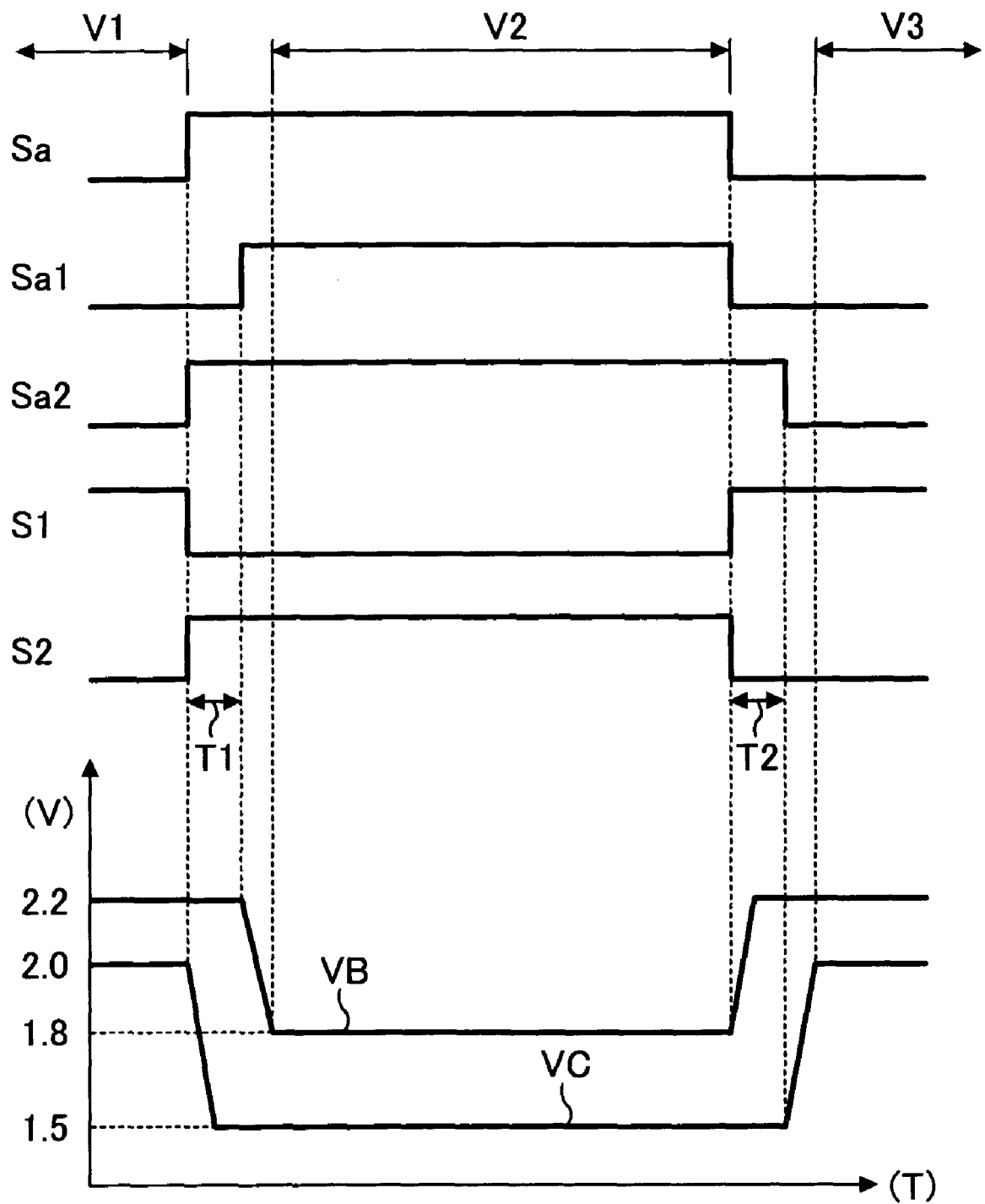
FIG. 7 is a time chart for explaining an operation of the DC stabilized power supply apparatus of FIG. 2.

Referring to a time chart of FIG. 7, further details of the operations performed by the voltage switching control circuit 4 of the DC stabilized power supply apparatus 1 are explained. In FIG. 7, when the voltage switching signal Sa is raised to a high level in order to reduce the output voltage VC to a predetermined value, the controller 13 outputs the control signal S1 at a low level to the first delay circuit 11 and the control signal S2 at a high level to the second delay circuit 12. Accordingly, the first delay circuit 11 increase the voltage switching signal Sa1 from the low level to a high level in the delay time T1, while the second delay circuit 12 outputs the voltage switching signal Sa as the voltage switching signal Sa2.

As a result, the voltage switching signal Sa2 rises from a low level to the high level and the series regulator 3 reduces the output voltage VC from 2.0 volts to 1.5 volts. Then, in the delay time T1, the voltage switching signal Sa1 rises from the low level to the high level and the switching regulator 2 reduces the output voltage VB from 2.2 volts to 1.8 volts. In this case, the delay time T1 is set to a time period slightly longer than a time period required for the series regulator 3 to reduce the output voltage VC from 2.0 volts to 1.5 volts.

When both output voltages VB and VC are reduced, the saturation voltage of the output control transistor Q11 of the series regulator 3 and a ripple to the output voltage VB of the switching regulator 2 may slightly be increased, for example. To absorb these possible variations, the reduction of the output voltage VC is set greater than the reduction of the output voltage VB. In a case that almost no variation is caused, the reduction of the output voltage VB can be set equally to the reduction of the output voltage VC.

Then, when the voltage switching signal Sa is reduced to the low level in order to increase the output voltage VC to a predetermined value, the controller 13 outputs the control signal S1 at the high level to the first delay circuit 11 and the control signal S2 at the low level to the second delay circuit 12. As a consequence, the second delay circuit 12 drops the voltage switching signal Sa2 from the high level to the low level in the delay time T2, while the first delay circuit 11 outputs the voltage switching signal Sa as the voltage switching signal Sa1.

As a result, the voltage switching signal Sa1 falls from the high level to the low level and the switching regulator 2 increase the output voltage VB from 1.8 volts to 2.2 volts. Then, in the delay time T2, the voltage switching signal Sa2 falls from the high level to the low level and the series regulator 3 increases the output voltage VC from 1.5 volts to 2.0 volts. In this case, the delay time T2 is set to a time period slightly longer than a time period required for the switching regulator 2 to increase the output voltage VB from 1.8 volts to 2.2 volts.

Figure 8:
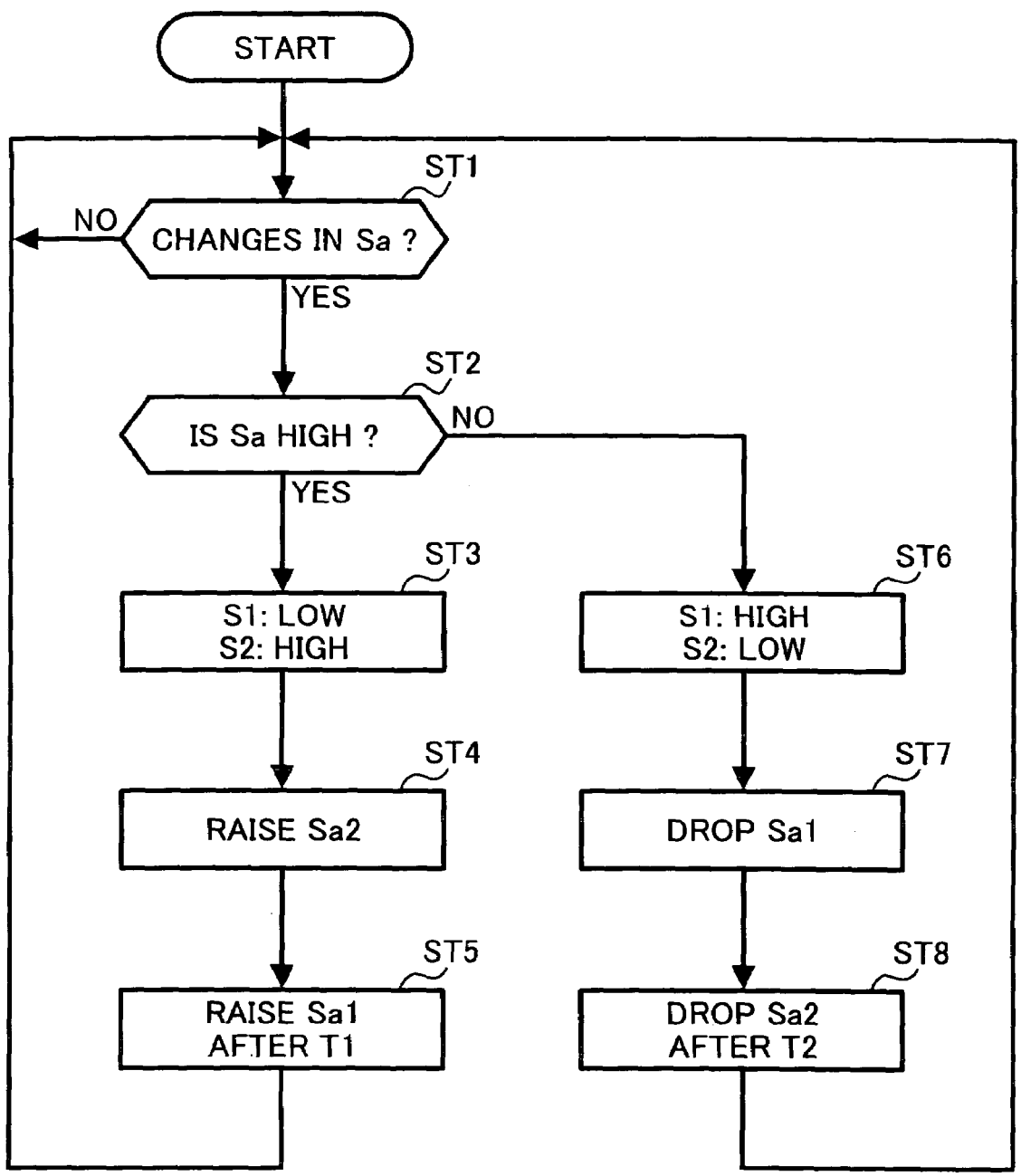
FIG. 8 is a flowchart for explaining an exemplary procedure of the voltage switching control circuit of FIG. 2.

Referring to FIG. 8, an exemplary procedure of the operation performed by the voltage switching control circuit 4 is explained. In Step ST1 of FIG. 8, the controller 13 monitors the voltage switching signal Sa input thereto to detect variations thereof. The controller 13 continues this monitoring of Step ST1 until it detects variations in the voltage switching signal Sa. Upon a detection of variations in the voltage switching signal Sa, the controller 13 determines whether the voltage switching signal Sa is at the high level, in Step ST2. When the voltage switching signal Sa is determined as being at the high level in Step ST2, the controller 13 outputs the control signal S1 at the low level to the first delay circuit 11 and the control signal S2 at the high level to the second delay circuit 12, in Step ST3.

Then, in Step ST4, the second delay circuit 12 immediately raises the voltage switching signal Sa2 from the low level to the high level. After that, the first delay circuit 11 raises the voltage switching signal Sa1 from the low level to the high level in the delay time T1, in Step ST5, and the process then returns to Step ST1.

When the voltage switching signal Sa is determined as being at the low level in Step ST2, the controller 13 outputs the control signal S1 at the high level to the first delay circuit 11 and the control signal S2 at the low level to the second delay circuit 12, in Step ST6. Then, the first delay circuit 11 immediately drops the voltage switching signal Sa1 from the high level to the low level, in Step ST7. After that, in Step STB, the second delay circuit 12 drops the voltage switching signal Sa2 from the high level to the low level in the delay time T2 and the process then returns to Step ST1.

In this way, the voltage switching control circuit 13 controls the voltage switching signal Sa to switch the output voltage VC between two levels. It is also possible to cause the voltage switching control circuit 13 to control the voltage switching signal Sa to switch the output voltage VC among more than two levels.

Figure 9:
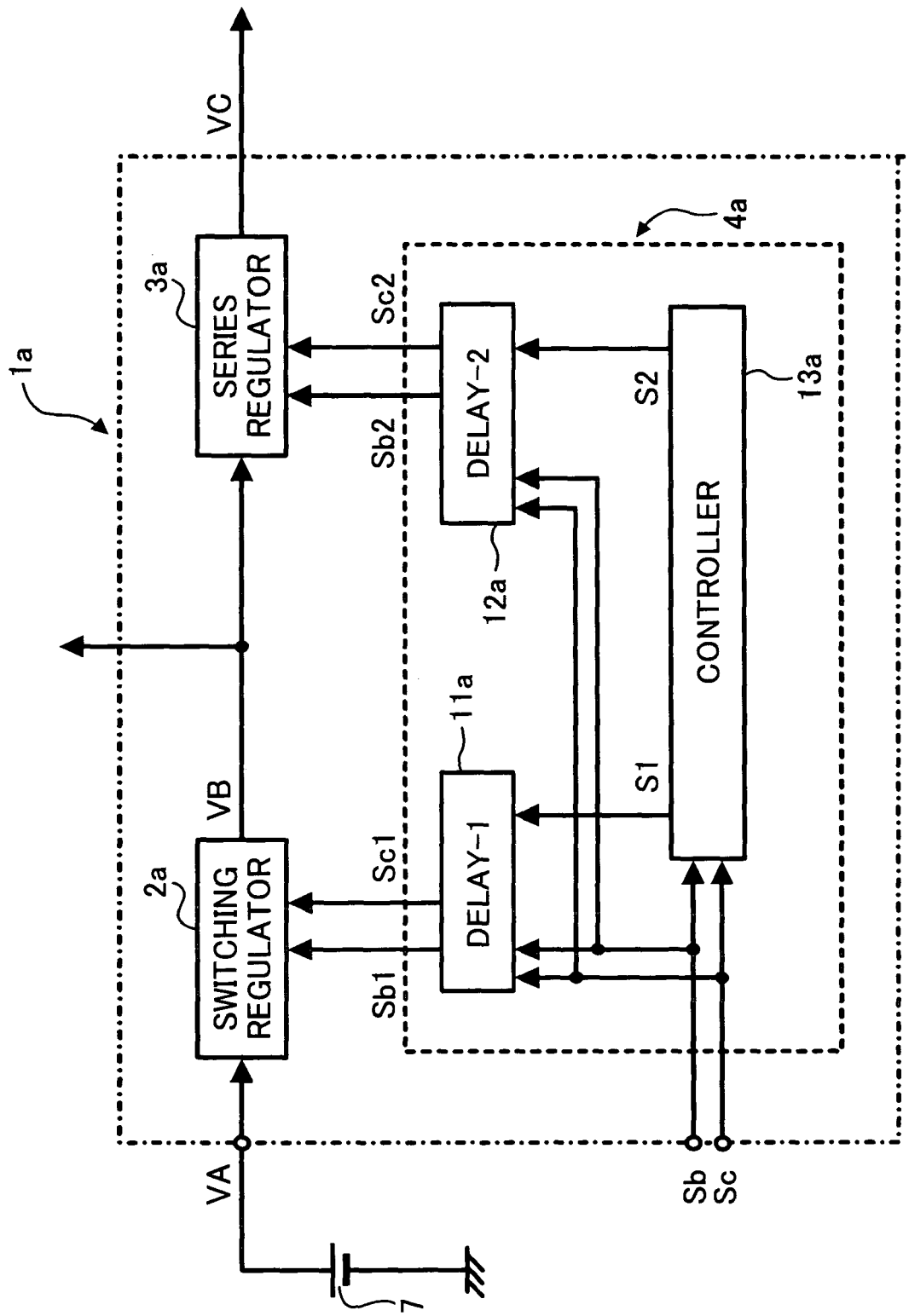
FIG. 9 is a schematic diagram of a DC stabilized power supply apparatus according to another preferred embodiment of the present invention.

Next, a DC stabilized power supply apparatus 1a which switches the output voltage VC among three kinds of voltage is explained with reference to FIG. 9. As shown in FIG. 9, the DC stabilized power supply apparatus 1a includes a switching regulator 2a, a series regulator 3a, and a voltage switching control circuit 4a. The switching regulator 2a switches its outputs voltages among three predetermined voltages in accordance with control signals input thereto. The series regulator 3a switches its outputs voltages among three predetermined voltages in accordance with control signals thereto. The voltage switching control circuit 4a controls a time to output external voltage switching signals Sb and Sc to the switching regulator 2a and the series regulator 3a.

The voltage switching control circuit 4a includes a first delay circuit (DELAY-1) 11a and a second delay circuit (DELAY-2) 12a, and a controller 13a. The first delay circuit 11a delays the voltage switching signals Sb and Sc by a delay time T1, and sends respectively delayed voltage switching signals Sb1 and Sc1 to the switching regulator 2a. The second delay circuit 12a delays the voltage switching signals Sb and Sc by a delay time T2, and sends respectively delayed voltage switching signals Sb2 and Sc2 to the series regulator 3a. The controller 13a sends the control signal S1 to the first delay circuit 11a and the control signal S2 to the second delay circuit 12a, in accordance with the voltage switching signals Sb and Sc. The first delay circuit 11a outputs the delayed voltage switching signals Sb1 and Sc1 based on the voltage switching signals Sb and Sc, respectively, to the switching regulator 2a, in response to the control signal S1. The second delay circuit 12a outputs the delayed voltage switching signals Sb2 and Sc2 based on the voltage switching signals Sb and Sc, respectively, to the series regulator 3a, in response to the control signal S2.

The switching regulator 2a derives the power voltage VA as power from the DC (direct current) power supply 7 and generates the output voltage VB based on the power voltage VA and in accordance with the voltage switching signals Sb1 and Sc1. The series regulator 3a receives the output voltage VB from the switching regulator 2a and generates the output voltage VC based on the voltage VB and in accordance with the voltage switching signals Sb2 and Sc2.

The controller 13a causes the first delay circuit 11a to send the voltage switching signals Sb1 and Sc1, generated by delaying the voltage switching signals Sb and Sc, respectively, to the switching regulator 2a and also causes the second delay circuit 12a to send the voltage switching signals Sb and Sc as the voltage switching signals Sb2 and Sc2, respectively, to the series regulator 3a, upon receiving the voltage switching signals Sb and Sc such that the output voltage VC is reduced to a predetermined value. Further, upon receiving the voltage switching signals Sb and Sc such that the output voltage VC is reduced to a predetermined value, the controller 13a controls the first delay circuit 11a to send the voltage switching signals Sb and Sc as the voltage switching signals Sb1 and Sc1, respectively, to the switching regulator 2a and also controls the second delay circuit 12a to send the voltage switching signals Sb2 and Sc2, generated by delaying the voltage switching signals Sb and Sc, respectively, to the series regulator 3a.

Figure 10:
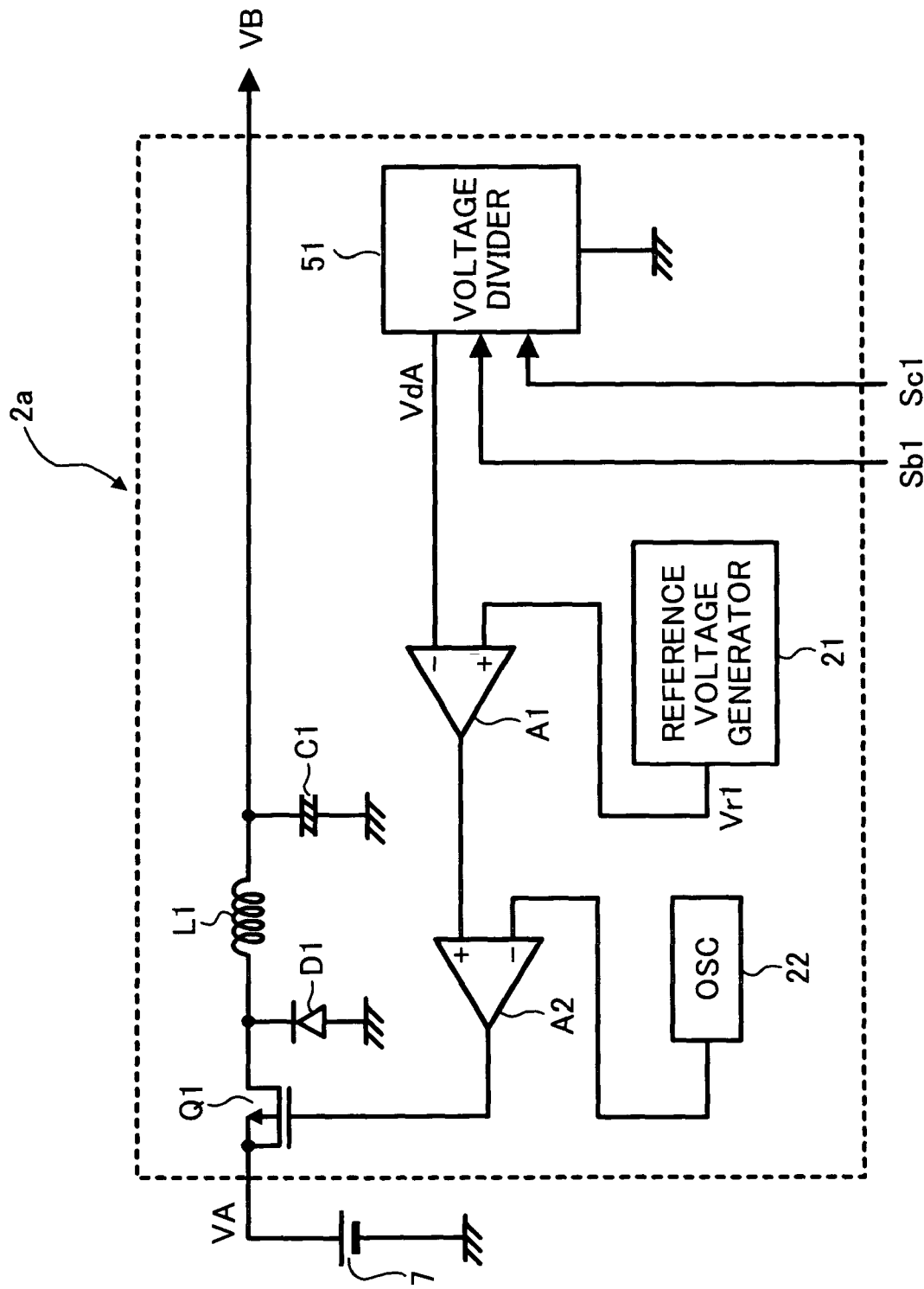
FIG. 10 is a schematic diagram of a switching regulator of the DC stabilized power supply apparatus of FIG. 9.

Referring to FIG. 10, more details of the switching regulator 2a is explained. The switching regulator 2a of FIG. 10 is made based on the switching regulator 2 of FIG. 3, and the components remaining identical are labeled with the same reference numerals in FIG. 10. The discussion below focuses on portions of the switching regulator 2a different from the switching regulator 2, and the description for the portions identical to each other are omitted.

As shown in FIG. 10, the switching regulator 2a substitutes a voltage divider 51 for the circuit of the resistors R1-R4 and the Switch SW1. The voltage divider 51 divides the output voltage VB at a voltage dividing ratio in accordance with the voltage switching signals Sb1 and Sc1 input, and outputs a divided voltage VdA. The error amplifier A1 amplifies a voltage difference between the divided voltage VdA and the reference voltage Vr1 generated by the reference voltage generator 21. Then, the comparator A2 compares an output voltage signal from the error amplifier A1 with a voltage of a chopping wave signal output from the oscillator (OSC) 22. The comparator A2 controls a time period that the switching transistor Q1 is turned on, in accordance with the comparison result. For example, when the voltage switching signals Sb1 and Sc1 are input such that the output voltage VB is reduced, the voltage divider 51 changes the voltage dividing ratio to reduce the divided voltage VdA in response to the voltage switching signals Sb1 and Sc1. Likewise, when the voltage switching signals Sb1 and Sc1 are input such that the output voltage VB is increased, the voltage divider 51 changes the voltage dividing ratio to increase the divided voltage VdA in response to the voltage switching signals Sb1 and Sc1.

Figure 11:
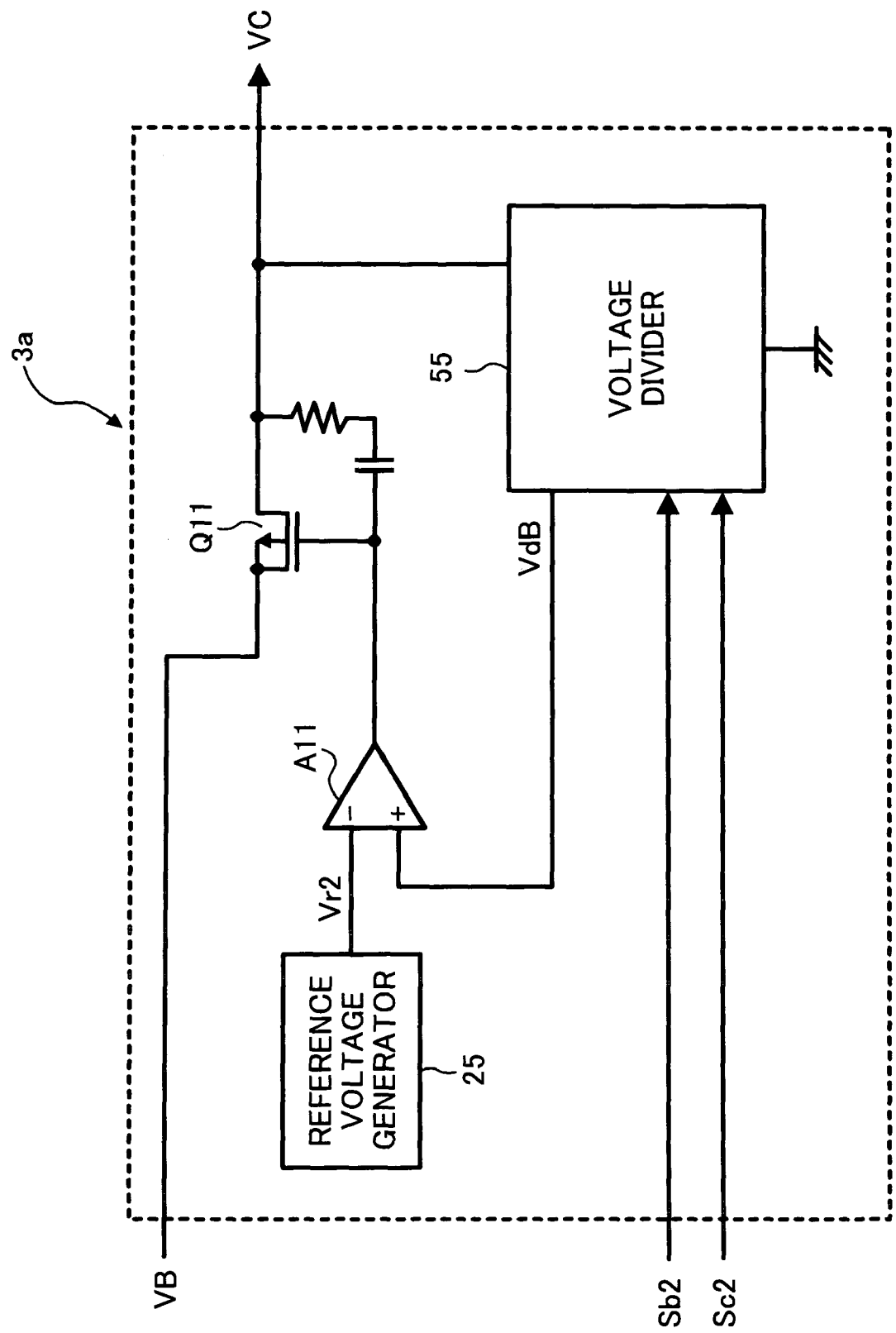
FIG. 11 is a schematic diagram of a series regulator of the DC stabilized power supply apparatus of FIG. 9.

Referring to FIG. 11, more details of the series regulator 3a is explained. The series regulator 3a of FIG. 11 is made based on the series regulator 3 of FIG. 4, and the components remaining identical are labeled with the same reference numerals in FIG. 11. The discussion below focuses portions of the series regulator 3a different from the series regulator 3, and the description for the portions identical to each other are omitted.

As shown in FIG. 11, the series regulator 3a substitutes a voltage divider 55 for the circuit of the resistors R11-R14 and the Switch SW2. The voltage divider 55 divides the output voltage VC at a voltage dividing ratio in accordance with the voltage switching signals Sb2 and Sc2 input, and outputs a divided voltage VdB. The error amplifier A11 amplifies a voltage difference between the divided voltage and the reference voltage Vr2 generated by the reference voltage generator 25. The error amplifier A11 controls operations of the output control transistor Q11 to regulate the output voltage VC at a desired constant level. For example, when the voltage switching signals Sb2 and Sc2 are input such that the output voltage VC is reduced, the voltage divider 55 changes the voltage dividing ratio to increase the divided voltage VdB in response to the voltage witching signals Sb2 and Sc2. Likewise, when the voltage witching signals Sb2 and Sc2 are input such that the output oltage VC is increased, the voltage divider 55 changes the oltage dividing ratio to reduce the divided voltage VdB in response to the voltage switching signals Sb2 and Sc2.

Figure 12:
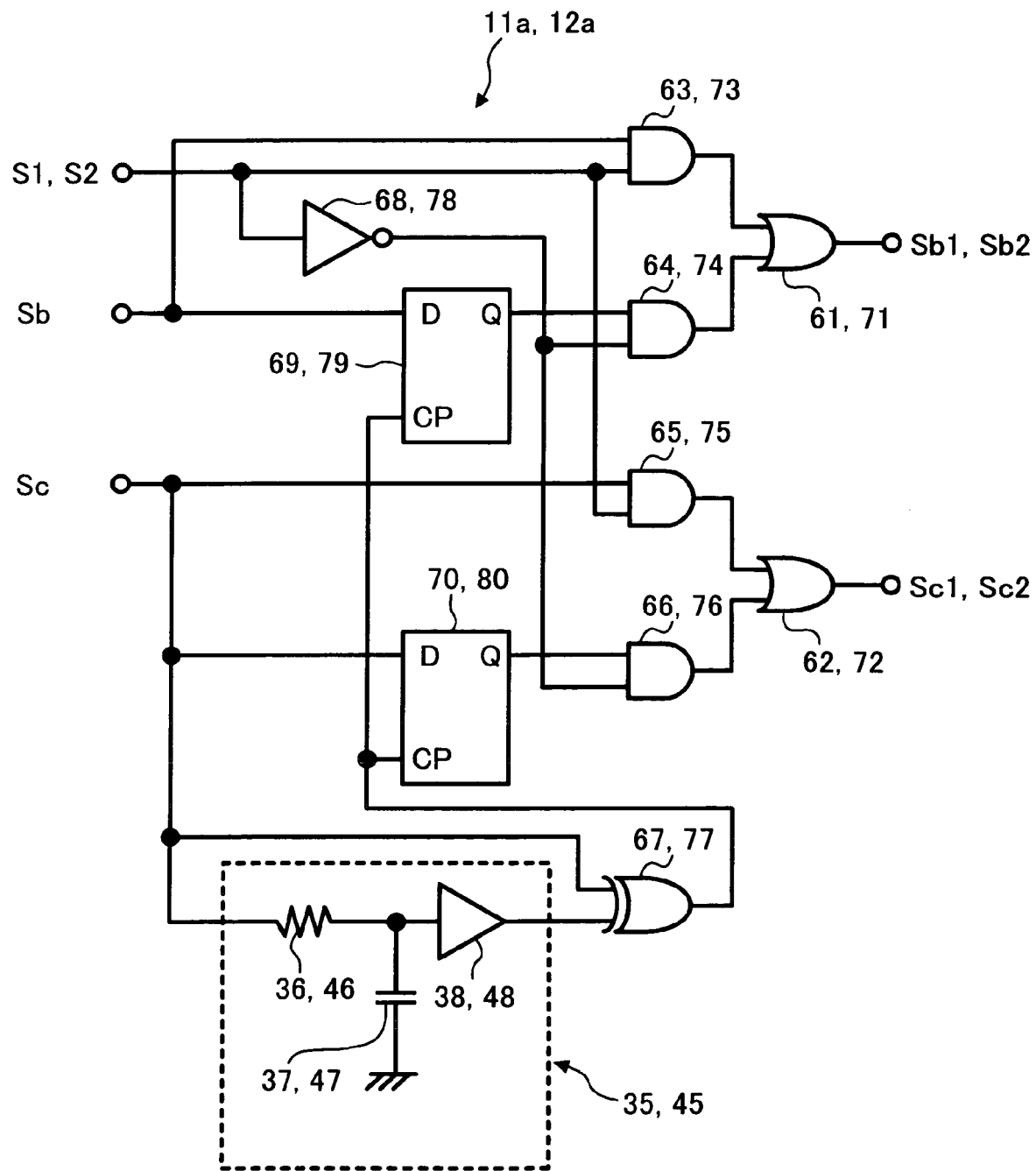
FIGS. 12 and 13 are schematic diagrams of exemplary first and second delay circuits of the DC stabilized power supply apparatus of FIG. 9.

Referring to FIG. 12, more details of the first and second delay circuits 11a and 12a are explained. The first and second delay circuits 11a and 12a are made based on the first and second delay circuits 11 and 12 of FIG. 5, and the components remaining identical are labeled with the same reference numerals in FIG. 12. The discussion below focuses portions of the first and second delay circuits 11a and 12a different from the first and second delay circuits 11 and 12, and the description for the portions identical to each other are omitted. As in the case with the first and second delay circuits 11 and 12, the first and second delay circuits IIa and 12a are provided with exemplary structures identical to each other, the discussion below uses a circuit diagram of an exemplary circuit, as shown in FIG. 12, with two reference numerals for the first and second delay circuits 11a and 12a, respectively.

As shown in FIG. 12, the first delay circuit 11a includes OR gate 61 and 62, AND gates 63-66, an exclusive OR (EX-OR) gate 67, an inverter 68, D-type flip-flop (D-FF) circuits 69 and 70, and the delay circuit 35. Likewise, the second delay circuit 12a includes OR gate 71 and 72, AND gates 73-76, an exclusive OR (EX-OR) gate 77, an inverter 78, D-type flip-flop circuits 79 and 80, and the delay circuit 45.

In the first delay circuit 11a, the control signal S1 from the controller 13a is input to one input terminal of each of the AND gates 63 and 65, and to one input terminal of each of the AND gates 64 and 66 via the inverter 68. The voltage switching signal Sb is input to the other input terminal of the AND gate 63 and to an input terminal D of the D-FF circuit 69. The D-FF circuit 69 outputs a signal from its output terminal Q to the other input terminal of the AND gate 64. The voltage switching signal Sc is input to the other input terminal of the AND gate 65, an input terminal D of the D-FF circuit 70, one input terminal of the EX-OR gate 67, and the input terminal of the delay circuit 35. The D-FF circuit 70 outputs a signal from its output terminal Q to the other input terminal of the AND gate 66. The voltage switching signal Sc input to the delay circuit 35 is input to the other input terminal of the EX-OR gate 67 via the resistor 36 and the buffer circuit 38. The EX-OR gate outputs a signal to a clock signal input terminal CP of each of the D-FF circuits 69 and 70. Output signals from the AND gates 63 and 64 are input to input terminals of the OR gate 61, and output signals from the AND gates 65 and 66 are input to input terminals of the OR gate 62. The OR gate 61 outputs a signal regarded as the voltage switching signal Sb1 and the OR gate 62 outputs a signal regarded as the voltage switching signal Sc1.

In the first delay circuit 11 having the above-described structure, upon receiving the control signal S1 at a high level, for example, the AND gate 63 outputs the voltage switching signal Sb and the output terminal of the AND gate 64 falls to a low level. As a consequence, the OR gate 61 outputs the voltage switching signal Sb1 which is the voltage switching signal Sb without a delay. At the same time, the AND gate 65 outputs the voltage switching signal Sc and the output terminal of the AND gate 66 falls to a low level. As a consequence, the OR gate 62 outputs the voltage switching signal Sc1 which is the voltage switching signal Sc without a delay.

When the control signal S1 at a low level is input, the output terminals of the AND gates 63 and 65 fall to a low level. At the same time, the AND gate 64 outputs an output signal from the output terminal Q of the D-FF circuit 69 and the AND gate 66 outputs an output signal from the output terminal Q of the D-FF circuit 70. Thus, the voltage switching signal Sb passes through the D-FF circuit 69, the AND gate 64, and the OR gate 61 and becomes the voltage switching signal Sb1. That is, the voltage switching signal Sb1 is made by delaying the voltage switching signal Sb by the delay time T1 with the delay circuit 35. Thereby, the delayed voltage switching signal Sb1 is output from the OR gate 61. Likewise, the voltage switching signal Sc passes through the D-FF circuit 70, the AND gate 66, and the OR gate 62 and becomes the voltage switching signal Sc1. That is, the voltage switching signal Sc1 is made by delaying the voltage switching signal Sc by the delay time T1 with the delay circuit 35. Thereby, the delayed voltage switching signal Sc1 is output from the OR gate 62.

In a manner similar to the above, the second delay circuit 12a outputs the voltage switching signal Sb2 from the OR gate 71 and the voltage switching signal Sc2 from the OR gate 72, both without a delay to the voltage switching signal Sb when the control signal S2 at a high level is input to the second delay circuit 12a. Also, the second delay circuit 12a outputs the voltage switching signal Sb2 from the OR gate 71 and the voltage switching signal Sc2 from the OR gate 72, both with the delay time T2 by the delay circuit 45 to the voltage switching signal Sc when the control signal S2 at a low level is input to the second delay circuit 12a.

Figure 13:
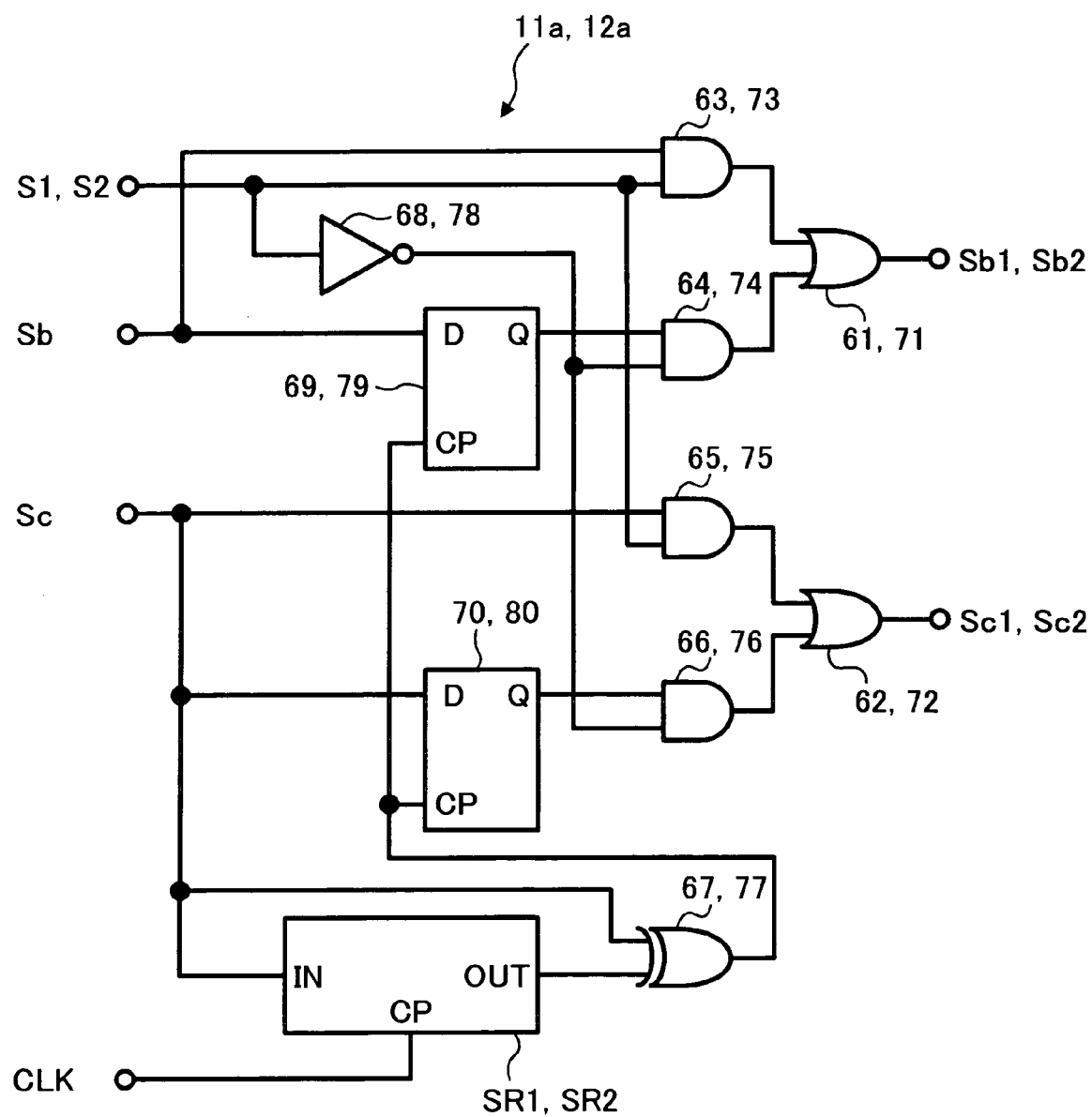

In the above circuits, the delay circuits 35 and 45 may be replaced by the shift registers SR1 and SR2 of FIG. 6, as shown in FIG. 13. As a further alternative, counter circuits may be used in place of the shift registers SR1 and SR2.

The switching regulator 2a switches voltage values of the output voltage VB in response to the voltage switching signals Sb1 and Sc1 input. The series regulator 3a switches voltage values of the output voltage VC in response to the voltage switching signals Sb2 and Sc2. For these operations by the switching regulator 2a and the series regulator 3a, as in the case of FIG. 2, to reduce the output voltage VC to a predetermined voltage value, the voltage switching control circuit 4a controls the series regulator 3a to switch the output voltage VC so that the output voltage VC is reduced and, after that, controls the switching regulator 2a to switch the output voltage VB so that the output voltage VB is reduced. Also, to increase the output voltage VC to a predetermined voltage value, the voltage switching control circuit 4a controls the switching regulator 2a to switch the output voltage VB so that the output voltage VB is increased and, after that, controls the series regulator 3a to switch the output voltage VC so that the output voltage VC is increased.

It is possible to use a CPU (central processing unit) with a memory for storing the above-mentioned delay time T1 and T2 and to operate the above-described operations with such CPU using a predetermined control program.

In this way, the DC stabilized power supply apparatus described above has the structure in which the switching regulator converts the power source voltage VA supplied from the DC power supply 7 into the output voltage VB and the series regulator converts the output voltage VB into the output voltage VC to output the output voltage VC to a load circuit connected thereto. To decrease the output voltage VC to a predetermined voltage value, the series-regulator is first controlled to decrease the output voltage VC to the predetermined voltage value. Then, the switching regulator is controlled to decrease the output voltage VB. On the other hand, to increase the output voltage value VC to a predetermined voltage value, the switching regulator is first controlled to increase the output voltage VB and, after that, the series regulator is controlled to increase the output voltage VC to the predetermined voltage value. With such a structure, the DC stabilized power supply apparatus can achieve a high efficiency of the power source while reducing electric noises and ripples in the output voltage. Further, the DC stabilized power supply apparatus can stably change the output voltage in response to operational conditions of the load circuit connected thereto, without casing a sudden and excessive change in the output voltage.

Figure 14:
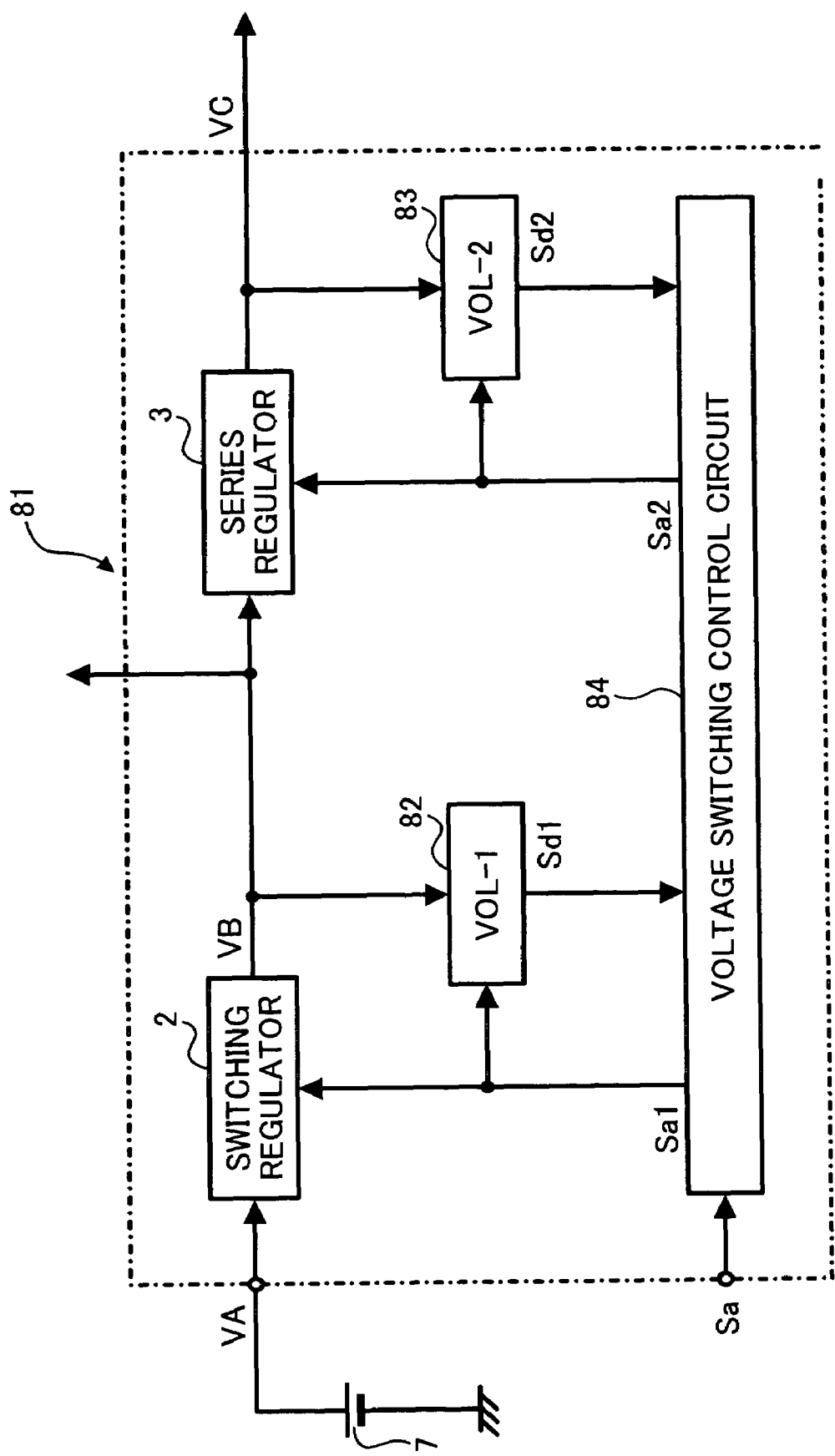
FIG. 14 is a schematic diagram of a DC stabilized power supply apparatus according to another preferred embodiment of the present invention.

Next, a DC stabilized power supply apparatus 81 according to another preferred embodiment is explained with reference to FIG. 14. The DC stabilized power supply apparatus 81 of FIG. 14 is made based on the DC stabilized power supply apparatus 1 of FIG. 2, and the components remaining identical are labeled with the same reference numerals in FIG. 14. The discussion below focuses on portions of the DC stabilized power supply apparatus 81 different from the DC stabilized power supply apparatus 1, and the description for the portions identical to each other are omitted.

As shown in FIG. 14, the DC stabilized power supply apparatus 81 includes the switching regulator 2, the series regulator 3, a first voltage detection circuit (VOL-1) 82, a second voltage detection circuit (VOL-2) 83, and a voltage switching control circuit 84. The first voltage detection circuit 82 detects an event in which the output voltage VB from the switching regulator 2 becomes a predetermined voltage and outputs a detection result. The second voltage detection circuit 83 detects an event in which the output voltage VC from the series regulator 3 becomes a predetermined voltage and outputs a detection result. The voltage switching control circuit 84 controls a time to send the voltage switching signal Sa, externally input, to the switching regulator 2 and the series regulator 3 in accordance with the detection results of the first and second voltage detection circuits 82 and 83.

More specifically, the voltage switching control circuit 84 controls a time to output the voltage switching signal Sa as a voltage switching signal Sa1 to the switching regulator 2 and the first voltage detection circuit 82 in accordance with the voltage switching signal Sa. Also, the voltage switching control circuit 84 controls a time to output the voltage switching signal Sa as a voltage switching signal Sa2 to the series regulator 3 and the second voltage detection circuit 83 in accordance with the voltage switching signal Sa. The first voltage detection circuit 82 sends a voltage detection signal Sd1 representing a detection result, indicating whether or not the output voltage VB of the switching regulator 2 becomes the predetermined voltage, to the voltage switching control circuit 84 in accordance with the voltage switching signal Sa1 sent from the voltage switching control circuit 84. Likewise, the second voltage detection circuit 83 sends a voltage detection signal Sd2 representing a detection result, indicating whether or not the output voltage VC of the series regulator 3 becomes the predetermined voltage, to the voltage switching control circuit 84 in accordance with the voltage switching signal Sa2 sent from the voltage switching control circuit 84. The voltage switching control circuit 84 controls a time to output the voltage switching signal Sa2 in accordance with the voltage detection signal Sd1 input and a time to output the voltage switching signal Sa1 in accordance with the voltage detection signal Sd2 input.

Figure 15:
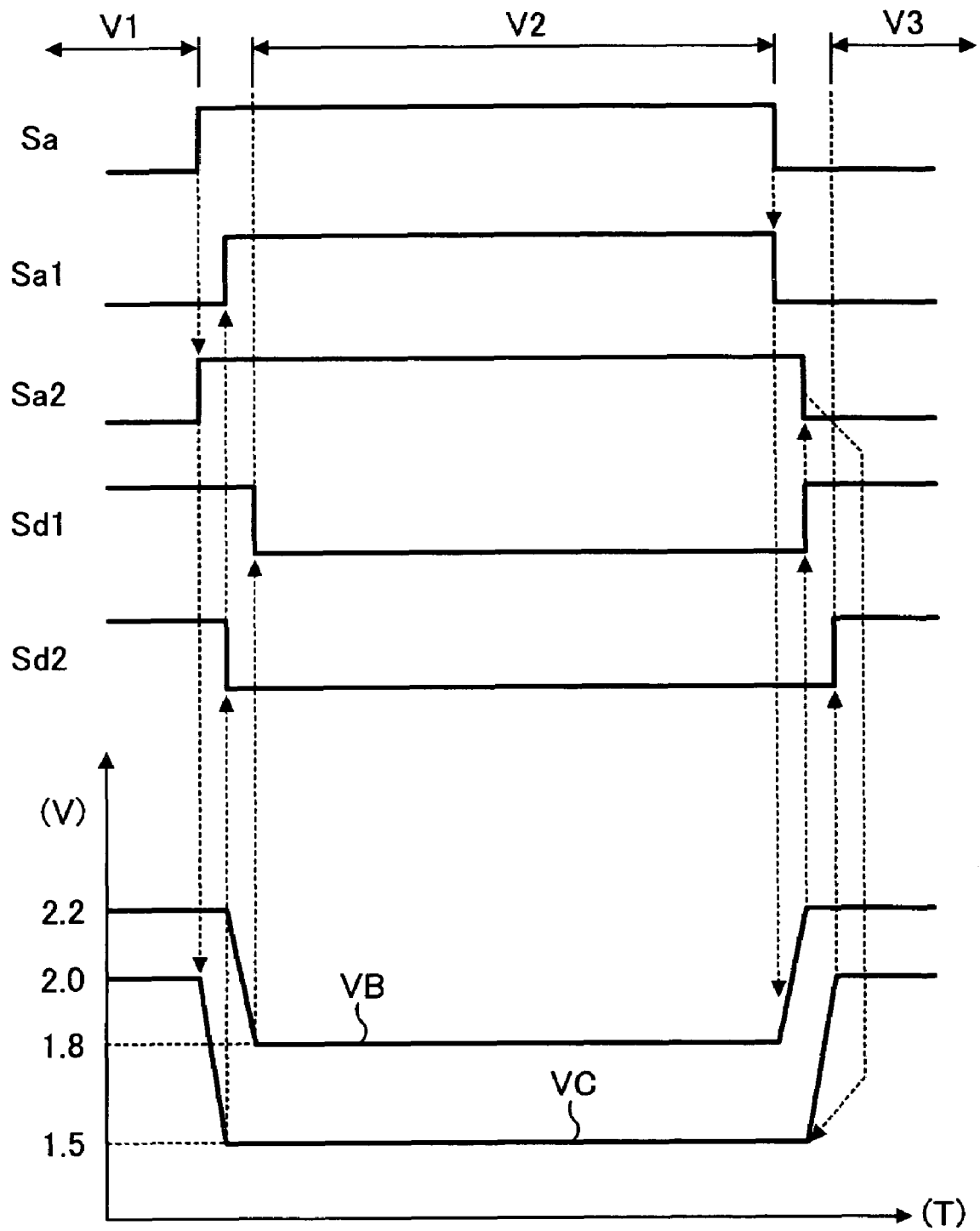
FIG. 15 is a time chart for explaining an operation of the DC stabilized power supply apparatus of FIG. 14.

Referring to a time chart of FIG. 15, further details of the operations performed by the voltage switching control circuit 84 of the DC stabilized power supply apparatus 81 are explained. FIG. 15 shows exemplary values of the output voltages VB and VC.

In FIG. 15, when the externally input voltage switching signal Sa is changed from a low level to a high level in order to reduce the output voltage VC, the voltage switching control circuit 84 immediately raises the voltage switching signal Sa2 to be sent to the series regulator 3 and the second voltage detection circuit 83. Accordingly, the series regulator 3 reduces the output voltage VC from 2.0 volts to 1.5 volts, and the second voltage detection circuit 83 monitors the output voltage VC. Upon a detection that the output voltage VC drops to 1.5 volts, the second voltage detection circuit 83 reduces the voltage detection signal Sd2, sent to the voltage switching control circuit 84, from a high level to a low level.

The voltage switching control circuit 84 raises the voltage switching signal Sa1, sent to the switching regulator 2 and the first voltage detection circuit 82, from a low level to a high level when the voltage detection signal Sd2 is dropped from a high level to a low level. Accordingly, the switching regulator 2 reduces the output voltage VB from 2.2 volts to 1.8 volts, and the first voltage detection circuit 82 monitors the output voltage VB. Upon a detection that the output voltage VB drops to 1.8 volts, the first voltage detection circuit 82 drops the voltage detection signal Sd1, sent to the voltage switching control circuit 84, from a high level to a low level.

By contrast, when the externally input voltage switching signal Sa is changed from a high level to a low level in order to increase the output voltage VC, the voltage switching control circuit 84 immediately drops the voltage switching signal Sa1 sent to the switching regulator 2 and the first voltage detection circuit 82. Accordingly, the switching regulator 2 increases the output voltage VB from 1.8 volts to 2.2 volts, and the first voltage detection circuit 82 monitors the output voltage VB. Upon a detection that the output voltage VB is increased to 12.25 volts, the second voltage detection circuit 82 increases the voltage detection signal Sd1, sent to the voltage switching control circuit 84, from a low level to a high level.

The voltage switching control circuit 84 drops the voltage switching signal Sa2, sent to the series regulator 3 and the second voltage detection circuit 83, from a high level to a low level when the voltage detection signal Sd1 is raised from a low level to a high level. Accordingly, the series regulator 3 raises the output voltage VC from 1.5 volts to 2.0 volts, and the second voltage detection circuit 83 monitors the output voltage VC. Upon a detection that the output voltage VC is raised to 2.0 volts, the second voltage detection circuit 83 raises the voltage detection signal Sd2, sent to the voltage switching control circuit 84, from a low level to a high level.

Figure 16:
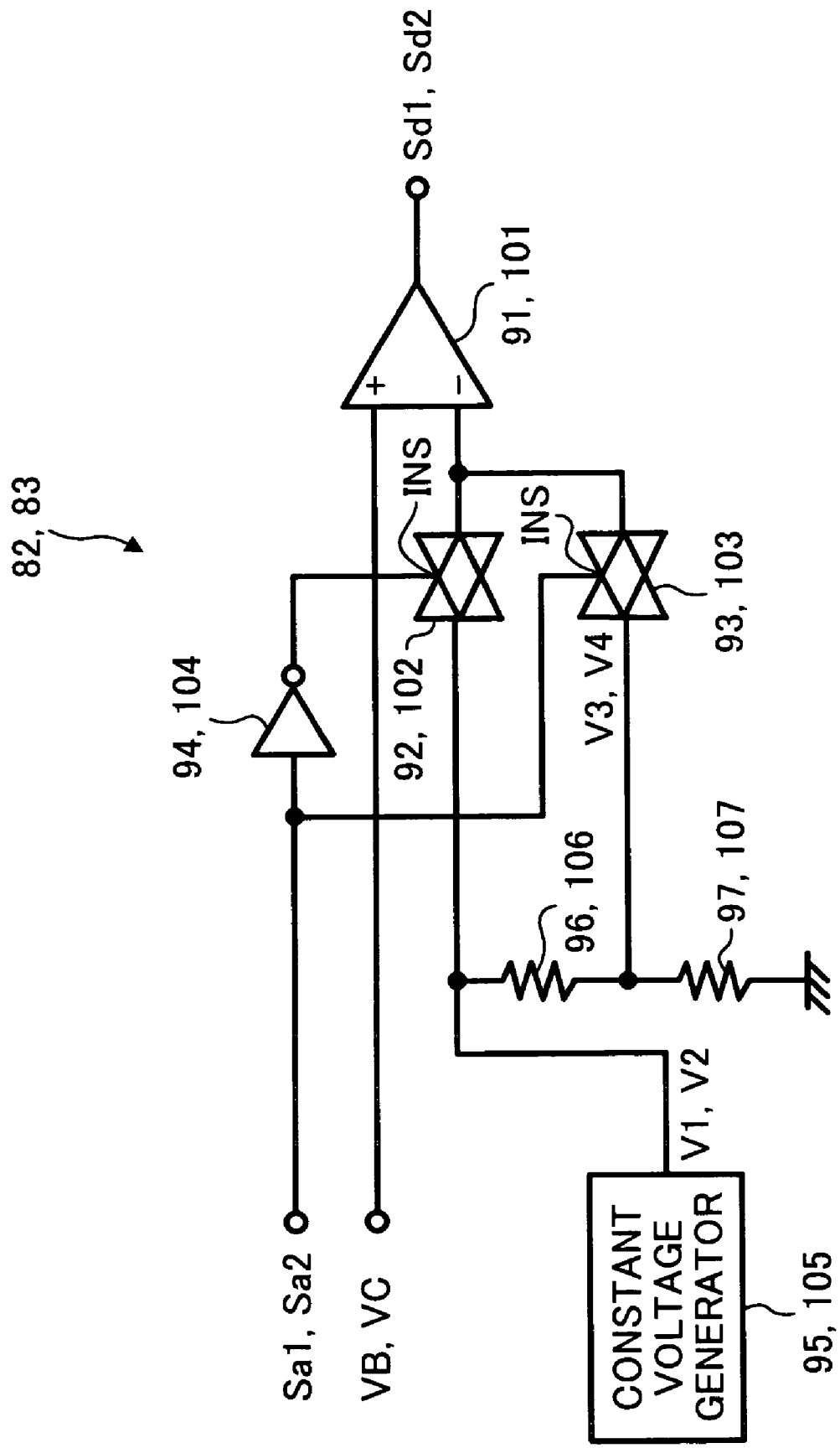
FIG. 16 is a schematic diagram of exemplary first and second delay circuits of the DC stabilized power supply apparatus of FIG. 14.

Referring to FIG. 16, details of the first and second voltage detection circuits 82 and 83 are explained. Since the first and second voltage detection circuits 82 and 83 are provided with exemplary structures which can be identical to each other, the discussion below uses a circuit diagram of an exemplary common circuit, as shown in FIG. 16, with two reference numerals for the first and second voltage detection circuits 82 and 83, respectively.

As shown in FIG. 16, the first voltage detection circuit 82 includes a comparator 91, analog switches 92 and 93, an inverter 94, a constant voltage generator 95, and resistors 96 and 97. The constant voltage generator 95 generates and outputs a predetermined constant voltage V1 (e.g., 2.2 volts for the circuit of FIG. 15). Likewise, the second voltage detection circuit 83 includes a comparator 101, analog switches 102 and 103, an inverter 104, a constant voltage generator 105, and resistors 106 and 107. The constant voltage generator 105 generates and outputs a predetermined constant voltage V2 (e.g., 2.2 volts for the circuit of FIG. 15).

In the first voltage detection circuit 82, the voltage switching signal Sa1 from the voltage switching control circuit 84 is input to a control signal input terminal INS of the analog switch 93, and to a control signal input terminal INS of the analog switch 92 through the inverter 94. Each of the analog switches 92 and 93 is turned into conduction when its control signal input terminal INS receives a high level signal, and is brought out of conduction when the control signal input terminal INS receives a low level signal. When the analog switch 92 is activated, the constant voltage V1 from the constant voltage generator 95 is input to an inverse input terminal of the comparator 91. Also, when the analog switch 93 is activated, a voltage V3 (e.g., 1.8 volts in the circuit of FIG. 15) generated by a division of the constant voltage V1 with the resisters 96 and 97 is input to the inverse input terminal of the comparator 91. The comparator 91 has a non-inverse input terminal to which the output voltage VB is input.

When the voltage switching signal Sa1 becomes high, the analog switch 92 is brought out of conduction and the analog switch 93 is turned on to input the divided voltage V3 to the inverse input terminal of the comparator 91. Accordingly, the output voltage output from the output terminal of the comparator 91 becomes low when the output voltage VB is smaller than 1.8 volts. As a result, the first voltage detection circuit 82 outputs the voltage detection signal Sd1 at a low level. On the other hand, when the voltage switching signal Sa1 becomes low, the analog switch 93 is brought out of conduction and the analog switch 92 is turned on to input the constant voltage V1 to the inverse input terminal of the comparator 91. Accordingly, the output voltage output from the output terminal of the comparator 91 becomes high when the output voltage VB is greater than 2.2 volts. As a result, the first voltage detection circuit 82 outputs the voltage detection signal Sd1 at a high level.

Likewise, in the second voltage detection circuit 83, the voltage switching signal Sa2 from the voltage switching control circuit 84 is input to a control signal input terminal INS of the analog switch 103, and to a control signal input terminal INS of the analog switch 102 through the inverter 104. Each of the analog switches 102 and 103 is turned into conduction when its control signal input terminal INS receives a high level signal, and is brought out of conduction when the control signal input terminal INS receives a low level signal. When the analog switch 102 is activated, the constant voltage V2 from the constant voltage generator 105 is input to an inverse input terminal of the comparator 101. Also, when the analog switch 103 is activated, a voltage V4 (e.g., 1.5 volts in the circuit of FIG. 15) generated by a division of the constant voltage V2 with the resisters 106 and 107 is input to the inverse input terminal of the comparator 101. The comparator 101 has a non-inverse input terminal to which the output voltage VC is input.

When the voltage switching signal Sa2 becomes high, the analog switch 102 is brought out of conduction and the analog switch 103 is turned on to input the divided voltage V4 to the inverse input terminal of the comparator 101. Accordingly, the output voltage output from the output terminal of the comparator 101 becomes low when the output voltage VC is smaller than 1.5 volts. As a result, the second voltage detection circuit 83 outputs the voltage detection signal Sd2 at a low level. On the other hand, when the voltage switching signal Sa2 becomes low, the analog switch 103 is brought out of conduction and the analog switch 102 is turned on to input the constant voltage V2 to the inverse input terminal of the comparator 101. Accordingly, the output voltage output from the output terminal of the comparator 101 becomes high when the output voltage VC is greater than 2.0 volts. As a result, the second voltage detection circuit 83 outputs the voltage detection signal Sd2 at a high level.

Figure 17:
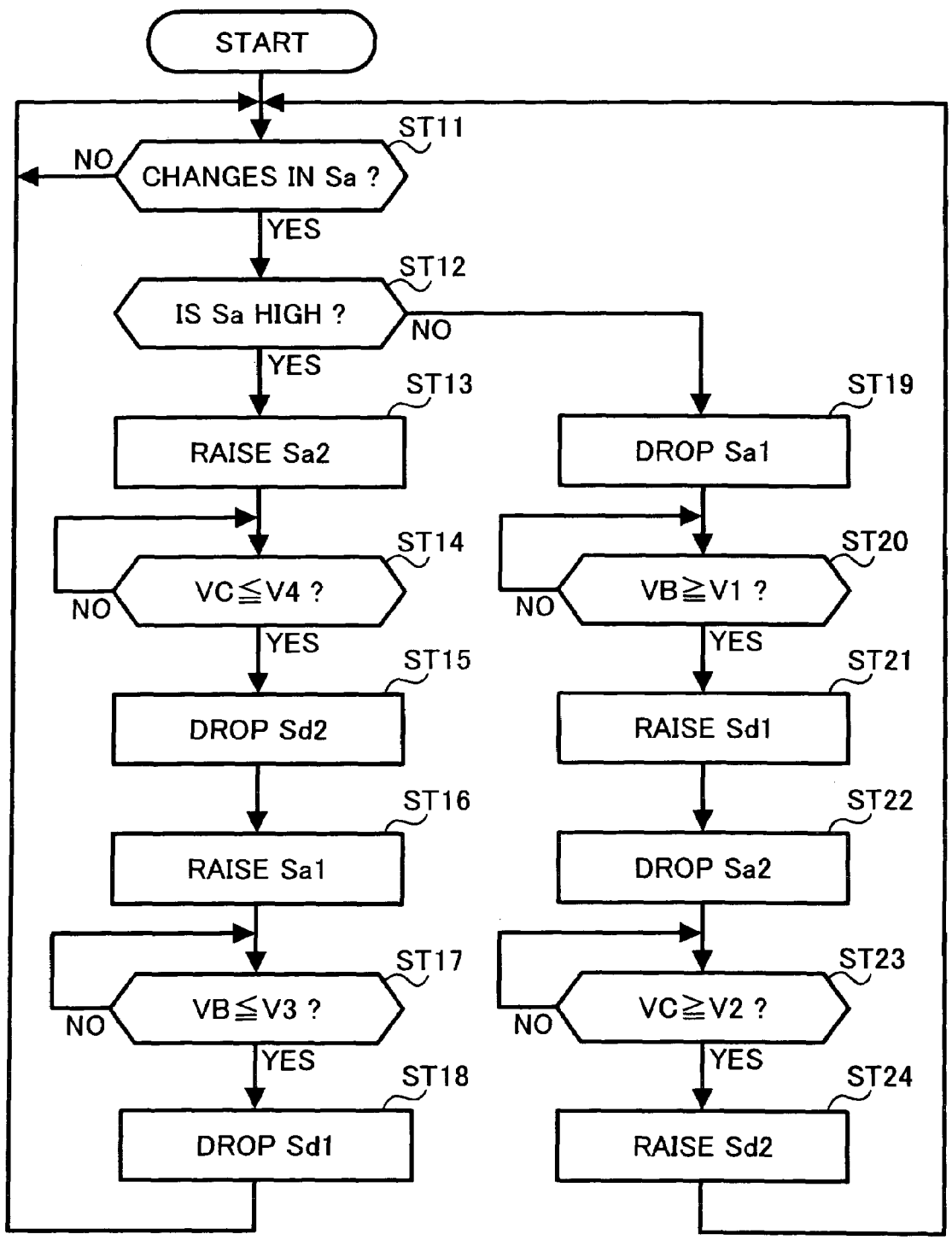
FIG. 17 is a flowchart for explaining an exemplary procedure of the voltage switching control circuit of FIG. 14.

Referring to FIG. 17, an exemplary procedure of the operation performed by the voltage switching control circuit 84 is explained. In Step ST11 of FIG. 17, the voltage switching control circuit 84 monitors the voltage switching signal Sa input thereto to detect variations thereof. The voltage switching control circuit 84 continues this monitoring of Step ST11 until it detects variations in the voltage switching signal Sa. Upon a detection of variations in the voltage switching signal Sa, the voltage switching control circuit 84 determines whether the voltage switching signal Sa is at the high level, in Step ST12. When the voltage switching signal Sa is determined as being at the high level in Step ST12, the voltage switching control circuit 84 changes the voltage switching signal Sa2 from the low level to the high level, in Step ST13.

Then, in Step ST14, the second voltage detection circuit 83 determines whether the output voltage VC becomes a value smaller than the predetermined voltage V4. When the output voltage VC is determined as not becoming a value smaller than the predetermined voltage V4, the second voltage detection circuit 83 continues the determination. When the output voltage VC is determined as becoming a value smaller than the predetermined voltage V4, the second voltage detection circuit 83 drops the voltage detection signal Sd2 from a high level to a low level, in Step ST15. Then, in Step ST16, the voltage switching control circuit 84 raises the voltage switching signal Sa1 from a low level to a high level. Then, in Step ST17, the first voltage detection circuit 82 determines whether the output voltage VB becomes a value smaller than the predetermined voltage V3. When the output voltage VB is determined as not becoming a value smaller than the predetermined voltage VB, the first voltage detection circuit 82 continues the determination. When the output voltage VB is determined as becoming a value smaller than the predetermined voltage V3, the first voltage detection circuit 82 drops the voltage detection signal Sd1 from a high level to a low level, in Step ST18. After that, the process returns to Step ST11.

When the voltage switching signal Sa is determined as not at the high level in Step ST12, the voltage switching control circuit 84 drops the voltage switching signal Sa1 from the high level to the low level, in Step ST19. Then, in Step ST20, the first voltage detection circuit 82 determines whether the output voltage VB becomes a value greater than the predetermined voltage V1. When the output voltage VB is determined as not becoming a value greater than the predetermined voltage V1, the first voltage detection circuit 82 continues the determination. When the output voltage VB is determined as becoming a value greater than the predetermined voltage V1, the first voltage detection circuit 82 raises the voltage detection signal Sd1 from a low level to a high level, in Step ST21.

Then, in Step ST22, the voltage switching control circuit 84 drops the voltage switching signal Sa2 from a high level to a low level. Then, in Step ST23, the second voltage detection circuit 83 determines whether the output voltage VC becomes a value greater than the predetermined voltage V2. When the output voltage VC is determined as not becoming a value greater than the predetermined voltage VC, the second voltage detection circuit 83 continues the determination. When the output voltage VC is determined as becoming a value greater than the predetermined voltage V2, the second voltage detection circuit 83 raises the voltage detection signal Sd2 from a low level to a high level, in Step ST24. After that, the process returns to Step ST11.

In this way, the voltage switching control circuit 84 controls the voltage switching signal Sa to switch the output voltage VC between two levels. It is also possible to cause the voltage switching control circuit 84 to control the voltage switching signal Sa to switch the output voltage VC among more than two levels.

Figure 18:
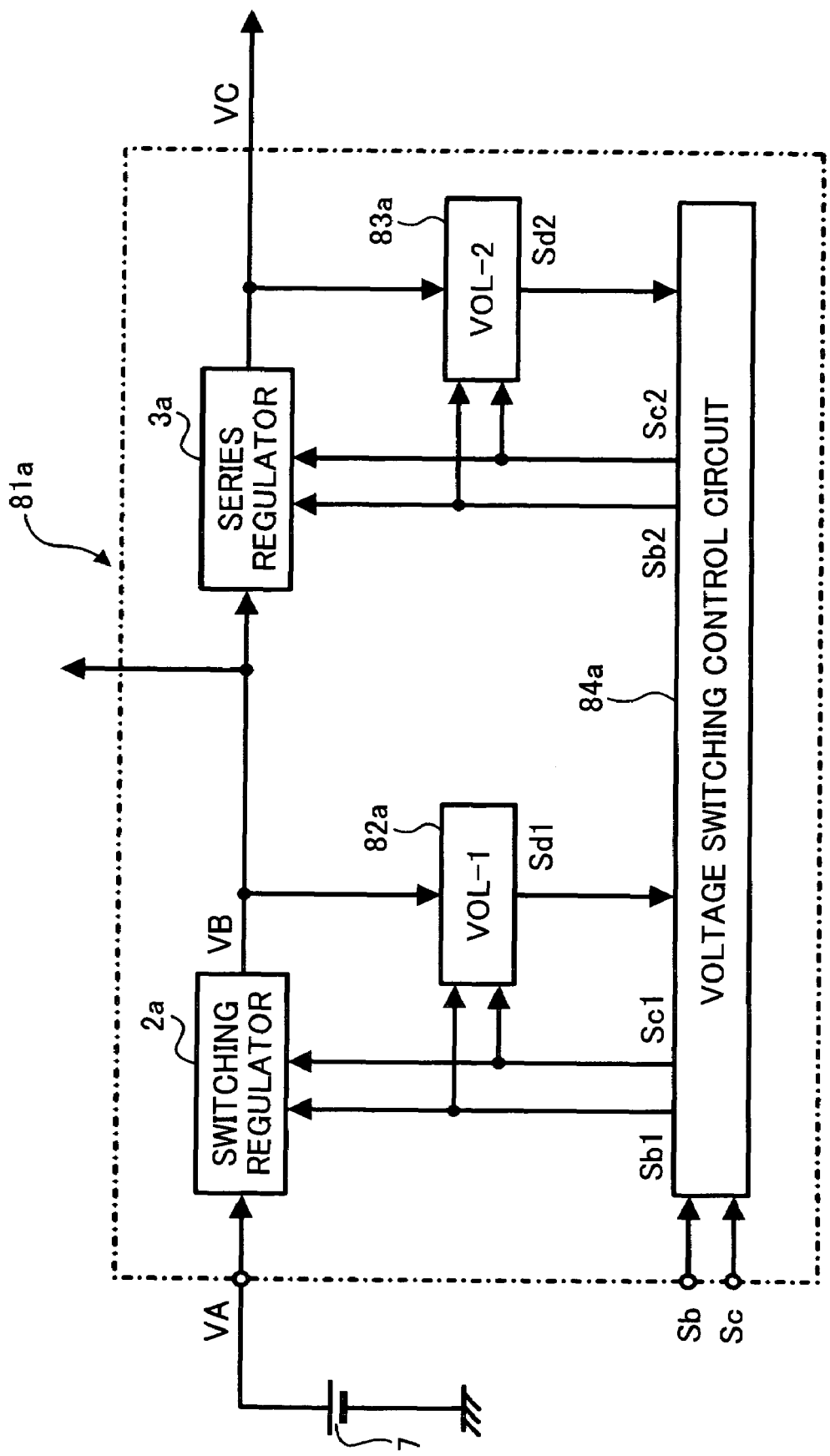
FIG. 18 is a schematic diagram of a DC stabilized power supply apparatus according to another preferred embodiment of the present invention.

Next, a DC stabilized power supply apparatus 81a which switches the output voltage VC among three kinds of voltage is explained with reference to FIG. 18. The DC stabilized power supply apparatus 81a of FIG. 18 is made based on the DC stabilized power supply apparatus 1a of FIG. 9, and the components remaining identical are labeled with the same reference numerals in FIG. 18. The discussion below focuses portions of the DC stabilized power supply apparatus 81 different from the DC stabilized power supply apparatus 1a, and the description for the portions identical to each other are omitted.

As shown in FIG. 18, the DC stabilized power supply apparatus 81a includes the switching regulator 2a, the series regulator 3a, a first voltage detection circuit (VOL-1) 82a, a second voltage detection circuit (VOL-2) 83a, and a voltage switching control circuit 84a. The first voltage detection circuit 82a detects an event in that the output voltage VB from the switching regulator 2a becomes a predetermined voltage and outputs a detection result. The second voltage detection circuit 83a detects an event in that the output voltage VC from the series regulator 3a becomes a predetermined voltage and outputs a detection result. The voltage switching control circuit 84a controls a time to send voltage switching signals Sb and Sc, externally input thereto, to the switching regulator 2a and the series regulator 3a in accordance with the detection results of the first and second voltage detection circuits 82a and 83a.

More specifically, the voltage switching control circuit 84a controls a time to output the voltage switching signals Sb and Sc as voltage switching signals Sb1 and Sc1, respectively, to the switching regulator 2a and the first voltage detection circuit 82a in accordance with the voltage switching signals Sb and Sc. Also, the voltage switching control circuit 84a controls a time to output the voltage switching signals Sb and Sc as voltage switching signals Sb2 and Sc2 to the series regulator 3a and the second voltage detection circuit 83a in accordance with the voltage switching signals Sb and Sc.

The switching regulator 2a derives the power voltage VA as power from the DC (direct current) power supply 7 and generates the output voltage VB based on the power voltage VA and in accordance with the voltage switching signals Sb1 and Sc1. The series regulator 3a receives the output voltage VB from the switching regulator 2a and generates the output voltage VC based on the voltage VB and in accordance with the voltage switching signals Sb2 and Sc2.

The first voltage detection circuit 82a sends a voltage detection signal Sd1 representing a detection result, indicating whether or not the output voltage VB of the switching regulator 2 becomes the predetermined voltage, to the voltage switching control circuit 84a in accordance with the voltage switching signals Sb1 and Sc1 sent from the voltage switching control circuit 84a. Likewise, the second voltage detection circuit 83a sends a voltage detection signal Sd2 representing a detection result, indicating whether or not the output voltage VC of the series regulator 3a becomes the predetermined voltage, to the voltage switching control circuit 84a in accordance with the voltage switching signals Sb2 and Sc2 sent from the voltage switching control circuit 84a. The voltage switching control circuit 84a controls a time to output the voltage switching signals Sb2 and Sc2 in accordance with the voltage detection signal Sd1 input thereto and a time to output the voltage switching signal Sb1 and Sc1 in accordance with the voltage detection signal Sd2 input thereto.

When the externally input voltage switching signals Sb and Sc are input such that the output voltage VC is reduced to a predetermined value, the voltage switching control circuit 84a immediately outputs the voltage switching signals Sb and Sc as the voltage switching signals Sb2 and Sc2, respectively, to the series regulator 3s and the second voltage detection circuit 83a. Accordingly, the series regulator 3a reduces the output voltage VC to a voltage in response to the voltage switching signals Sb2 and Sc2, and the second voltage detection circuit 83a monitors the output voltage VC. Upon a detection that the output voltage VC drops to a value in response to the voltage switching signals Sb2 and Sc2, the second voltage detection circuit 83a reduces the voltage detection signal Sd2, sent to the voltage switching control circuit 84a, from a high level to a low level, for example.

The voltage switching control circuit 84a outputs the voltage switching signals Sb and Sc as the voltage switching signals Sb1 and Sc1, respectively, to the switching regulator 2a and the first voltage detection circuit 82a when the voltage detection signal Sd2 is dropped from a high level to a low level. Accordingly, the switching regulator 2a reduces the output voltage VB to a voltage in response to the voltage switching signals Sb1 and Sc1, and the first voltage detection circuit 82a monitors the output voltage VB. Upon a detection that the output voltage VB drops to the value in response to the voltage switching signals Sb1 and Sc1, the first voltage detection circuit 82a drops the voltage detection signal Sd1, sent to the voltage switching control circuit 84a, from a high level to a low level.

By contrast, when the externally input voltage switching signals Sb and Sc are input such that the output voltage VC is increased to a predetermined voltage, the voltage switching control circuit 84a immediately outputs the voltage switching signals Sb and Sc as the voltage switching signals Sb1 and Sc1 to the switching regulator 2a and the first voltage detection circuit 82a. Accordingly, the switching regulator 2a increases the output voltage VB to a voltage in response to the voltage switching signals Sb1 and Sc1, and the first voltage detection circuit 82a monitors the output voltage VC. Upon a detection that the output voltage VB is increased to the voltage in response to the voltage switching signals Sb1 and Sc1, the second voltage detection circuit 82a increases the voltage detection signal Sd1, sent to the voltage switching control circuit 84a, from a low level to a high level, for example.

The voltage switching control circuit 84a outputs the voltage switching signals Sb and Sc as the voltage switching signals Sb2 and Sc2, respectively, to the series regulator 3a and the second voltage detection circuit 83a when the voltage detection signal Sd1 is raised from a low level to a high level. Accordingly, the series regulator 3s raises the output voltage VC to a voltage in response to the voltage switching signals Sb2 and Sc2, and the second voltage detection circuit 83a monitors the output voltage VC. Upon a detection that the output voltage VC is raised to the voltage in response to the voltage switching signals Sb2 and Sc2, the second voltage detection circuit 83a raises the voltage detection signal Sd2, sent to the voltage switching control circuit 84a, from a low level to a high level.

Figure 19:
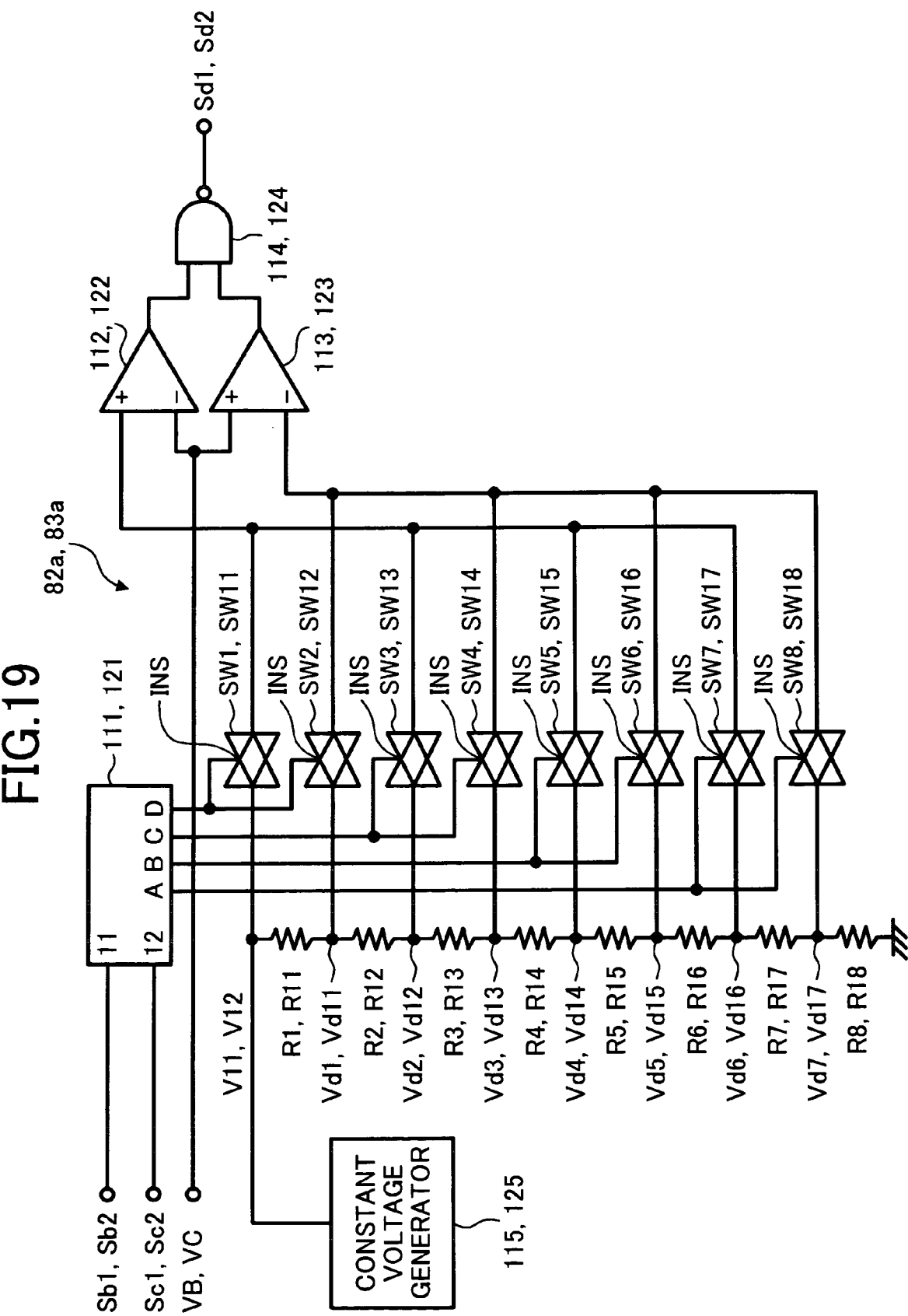
FIG. 19 is a schematic diagram of exemplary first and second delay circuits of the DC stabilized power supply apparatus of FIG. 18.

Referring to FIG. 19, details of the first and second voltage detection circuits 82a and 83a are explained. Since the first and second voltage detection circuits 82a and 83a are provided with exemplary structures which can be identical to each other, the discussion below uses a circuit diagram of an exemplary common circuit, as shown in FIG. 19, with two reference numerals for the first and second voltage detection circuits 82a and 83a, respectively.

As shown in FIG. 19, the first voltage detection circuit 82a includes a decoder 111, comparators 111 and 113, an NAND gate 114, a constant voltage generator 115, analog switches SW1-SW8, and resistors R1-R8. The constant voltage generator 115 generates a predetermined constant voltage V11. Likewise, the second voltage detection circuit 83a includes a decoder 121, comparators 121 and 123, an NAND gate 124, a constant voltage generator 125, analog switches SW11-SW18, and resistors R11-R18. The constant voltage generator 125 generates a predetermined constant voltage V12.

In the first voltage detection circuit 84a, the voltage switching signals Sb1 and Sc2 from the voltage switching control circuit 84a are input to input terminals 11 and 12, respectively, of the decoder 111. The decoder 111 decodes the voltage switching signals Sb1 and Sc1 using a specific method and outputs the respective resultant signals from output terminals A-D thereof. A signal output from the output terminal A is input to control signal input terminals INS of the analog switches SW7 and SW8. A signal output from the output terminals B is input to control signal input terminals INS of the analog switches SW5 and SW6. Likewise, a signal output from the output terminals C is input to control signal input terminals INS of the analog switches SW3 and SW4. A signal output from the output terminals D is input to control signal input terminals INS of the analog switches SW1 and SW2.

The resistors R1-R8 are connected in series to divide the predetermined constant voltage V11 from the constant voltage generator 115 into divided voltages Vd1-Vd7. The constant voltage 11 and the divided voltages Vd2, Vd4, and Vd6 are controlled to be input to the non-inverse input terminal of the comparator 112 by the analog switches SW1, SW3, SW5, and SW7, respectively. The divided voltages Vd1, Vd3, Vd5, and Vd7 are controlled to be input to the inverse input terminal of the comparator 113 by the analog switches SW2, SW4, SW6, and SW8, respectively. The non-inverse input terminal of the comparator 112 and the inverse input terminal of the comparator 113 are connected to the line of the output voltage VB. Each of output signals from the comparators 112 and 113 is input terminals of the NAND gate 114, and an output signal from the NAND gate 114 becomes the voltage detection signal Sd1.

The decoder 111 outputs a high level signal from one of the output terminals A-D in response to the voltage switching signals Sb1 and Sc1 in order to turn on the corresponding analog switch into conduction. The constant voltage V11 is set to 2.21 volts, for example, and the divided voltages Vd1-Vd7 are set to 2.19 volts, 2.01 volts, 1.99 volts, 1.81 volts, 1.79 volts, 1.51 volts, and 1.49 volts, respectively, for example.

When the output terminal D of the decoder 111 is brought into a high state, the analog switches SW1 and SW2 are turned on into conduction. The non-inverse input terminal of the comparator 112 is applied with a voltage of 2.21 volts and the inverse terminal of the comparator 113 is applied with a voltage of 2.19 volts. When the output voltage VB is equal to or greater than 2.19 volts and smaller than 2.21 volts (i.e., 2.19 volts≦VB<2.21 volts), the voltage detection signal Sd1 becomes low. When the output voltage VB is smaller than 2.19 volts or equal to or greater than 2.21 volts, the voltage detection signal Sd1 becomes high. When one of the output terminals A, B, and C of the decoder 111 is made high, the comparator outputs the Sd1 in a similar manner, of which explanation is omitted. In this way, the voltage detection circuit 82a detects whether the output voltage VB becomes a voltage in response to the input voltage switching signals Sb1 and Sc1 and outputs the voltage detection signal Sd1 in accordance with the detection result thereof.

A description for operations of the second voltage detection circuit 83a is omitted here since they can be referred to the explanation above made for the operations of the first voltage detection circuit 82a by simply replacing reference numerals from those of the first voltage detection circuit 82a to those of the second voltage detection circuit 83a.

Figure 20:
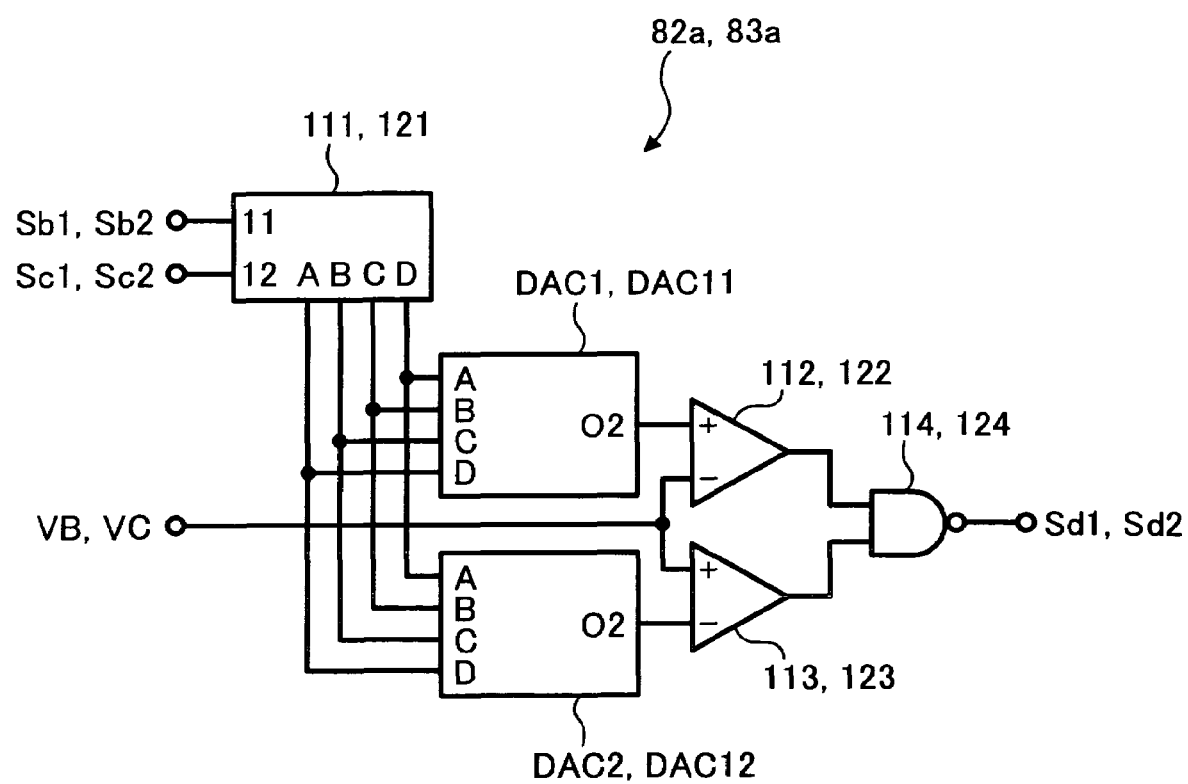
FIG. 20 is a schematic diagram of exemplary first and second delay circuits of the DC stabilized power supply apparatus of FIG. 18.

FIG. 20 shows the first and second voltage detections circuits 82a and 83a with exemplary substitutions of two D/A (digital-to-analog) converters DAC1 and DAC2 and two D/A (digital-to-analog) converters DAC11 and DAC12 for the constant voltage generator, the analog switches, and the resistors. In the first voltage detection circuits 82a of FIG. 20, each of the D/A converters DAC1 and DAC2 outputs a voltage in response to the levels of signals output from the output terminals A-D of the decoder 111. Likewise, in the first voltage detection circuits 83a of FIG. 20, each of the D/A converters DAC11 and DAC12 outputs a voltage in response to the levels of signals output from the output terminals A-D of the decoder 121.

In this way, the DC stabilized power supply apparatus described above has the structure in which when the output voltage VC is desired to be reduced to a specific voltage, the series regulator is first caused to reduce the output voltage VC and then the second voltage detection circuit is caused to detect whether the output voltage VC is reduced to the specific voltage. When the output voltage VC is detected as being reduced to the specific voltage, the switching regulator is caused to reduce the output voltage VB. To increase the output voltage VC to a specific voltage, the switching regulator is first controlled to increase the output voltage VB and the first voltage detection circuit is caused to check whether the output voltage VB is increased to the specific voltage. When the output voltage VB is found as being increased to the specific voltage, the series regulator is controlled to increase the output voltage VC. With such a structure, the DC stabilized power supply apparatus can decrease the output voltage VB immediately after the reduction of the output voltage VC to a desired voltage and increase the output voltage VC immediately after the increase of the output voltage VB to a desired voltage, thereby improving a speed of changing the output voltage VC. In addition, the DC stabilized power supply apparatus can achieve a high efficiency of the power source while reducing electric noises and ripples in the output voltage. Further, the DC stabilized power supply apparatus can stably change the output voltage in response to operational conditions of the load circuit connected thereto, without casing a sudden and excessive change in the output voltage.

Next, a DC stabilized power supply apparatus 1b according to another preferred embodiment is explained with reference to FIG. 21. The DC stabilized power supply apparatus 1b of FIG. 21 includes two series regulators. According to the preferred embodiment, the number of the series regulator is not limited to two but can be more than two. This DC stabilized power supply apparatus 1b is made based on the DC stabilized power supply apparatus 1 of FIG. 2 having a single series regulator, and the components remaining identical are labeled with the same reference numerals in FIG. 21. The discussion below focuses portions of the DC stabilized power supply apparatus 1b different from the DC stabilized power supply apparatus 1, and the description for the portions identical to each other are omitted.

Figure 21:
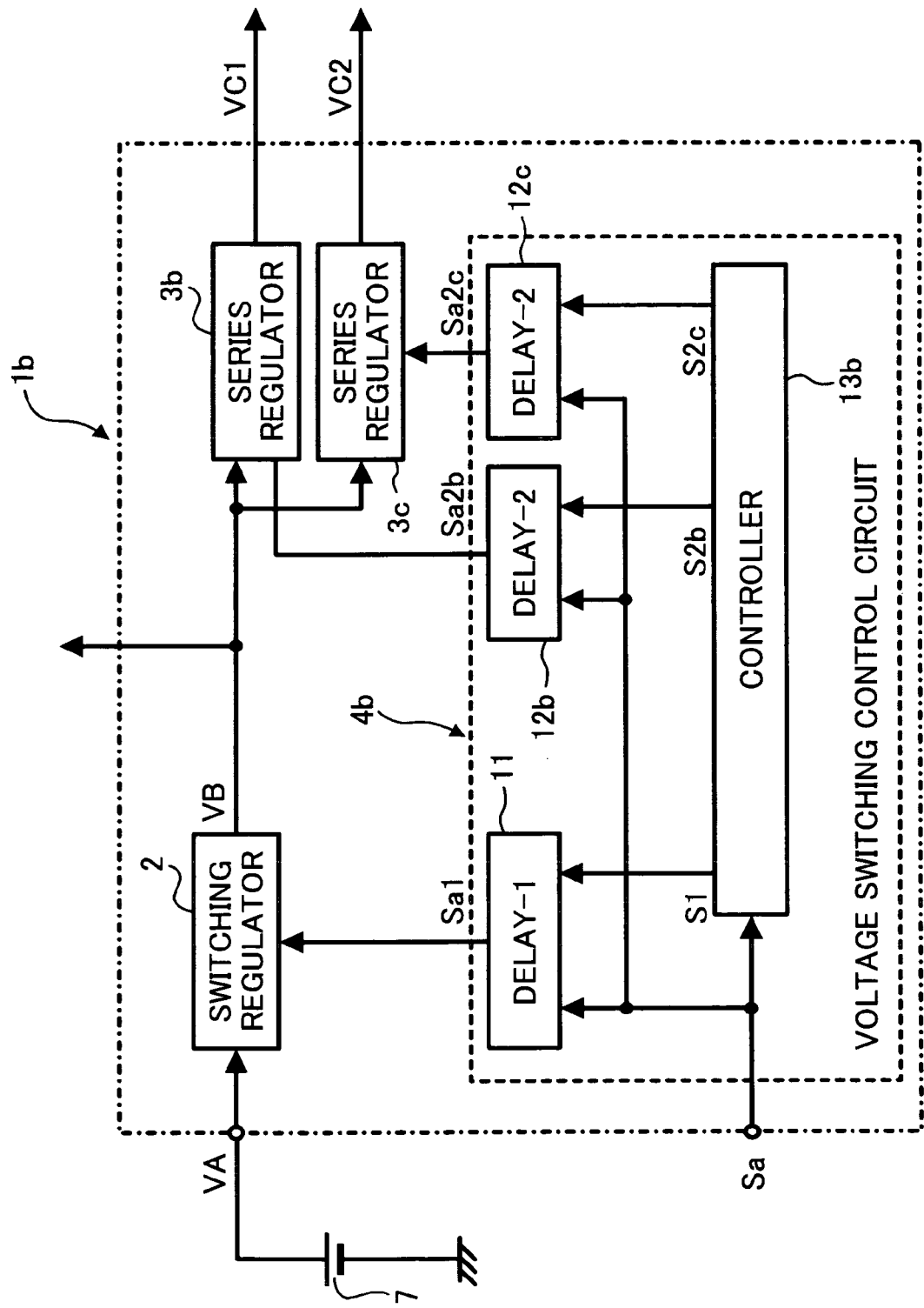
FIGS. 21 and 22 are schematic diagrams of DC stabilized power supply apparatuses according to other exemplary preferred embodiments of the present invention.

As shown in FIG. 21, the DC stabilized power supply apparatus 1b is provided with series regulators 3b and 3c in place of the series regulator 3 and is provided with second delay circuits (DELAY-2) 12b and 12c in place of the second delay circuit 12. The series regulators 3b and 3c correspond to the second delay circuits 12b and 12c, respectively. In connection with these changes, the DC stabilized power supply apparatus 1b is provided with a voltage switching control circuit 4b and a controller 13b in place of the voltage switching control circuit 4 and the controller 13, respectively.

In the DC stabilized power supply apparatus 1b of FIG. 21, each of the series regulators 3b and 3c switches its outputs voltages in accordance with control signals input thereto. The voltage switching control circuit 4a controls a time to output the externally input voltage switching signal Sa to the switching regulator 2 and to the series regulators 3b and 3c. The series regulator 3b receives the output voltage VB from the switching, regulator 2 and generates an output voltage VC1 based on the output voltage VB in accordance with the voltage switching signal Sa. The series regulator 3c receives the output voltage VB from the switching regulator 2 and generates an output voltage VC2 based on the output voltage VB in accordance with the voltage switching signal Sa.

The voltage switching control circuit 4a includes the first delay circuit (DELAY-1) 11, the second delay circuits (DELAY-2) 12b and 12c, and the controller 13b, as described above. The second delay circuit 12b delays the voltage switching signal Sa by a delay time T2b, and sends a delayed voltage switching signal Sa2b to the series regulator 3b. The second delay circuit 12c delays the voltage switching signal Sa by a delay time T2c, and sends a delayed voltage switching signal Sa2c to the series regulator 3c. The controller 13b controls the operations of the first delay circuit 11 and the second delay circuits 12b and 12c, in accordance with the voltage switching signal Sa. The delay time T2b and T2c may or may not be equal to each other, but more important is that each of the delay times T2b and T2c is slightly longer than a time period needed for an increase of the output voltage VB from the switching regulator 2.

The controller 13b sends the control signal S1 to the first delay circuit 11, a control signal S2b to the second delay circuit 12b, and a control signal S2c to the second delay circuit 12c. The second delay circuit 12b outputs a voltage switching signal Sa2b, generated by delaying the voltage switching signal Sa, to the series regulator 3b in response to the control signal S2b. The second delay circuit 12c outputs a voltage switching signal Sa2c, generated by delaying the voltage switching signal Sa, to the series regulator 3c in response to the control signal S2c.

When the voltage switching signal Sa is input to reduce the output voltages VC1 and VC2 to respective predetermined values, the controller 13b controls the first delay circuit 11 to output the voltage switching signal Sa1, generated by delaying the voltage switching signal Sa, to the switching regulator 2. At the same time, the controller 13b also controls the second delay circuits 12b and 12c to send the voltage switching signals Sa2b and Sa2c, generated with no delay to the voltage switching signal Sa, to the series regulators 3b and 3c, respectively. On the other hand, when the voltage switching signal Sa is input to increase the output voltages VC1 and VC2 to respective predetermined values, the controller 13b controls the first delay circuit 11 to send the voltage switching signal Sa1, generated with no delay to the voltage switching signal Sa, to the switching regulator 2. At the same time, the controller 13b also controls the second delay circuits 12b and 12c to send the voltage switching signals Sa2b and Sa2c, generated by delaying the voltage switching signal Sa, to the series regulators 3b and 3c.

In the way as described above, this DC stabilized power supply apparatus has the structure in which, to decrease the output voltages VC1 and VC2 to respective predetermined voltage values, the series regulators 3b and 3c are controlled to decrease the output voltages VC1 and VC2 to the predetermined voltage values. Then, the switching regulator 2 is controlled to decrease the output voltage VB. On the other hand, to increase the output voltage values VC1 and VC2 to predetermined voltage values, the switching regulator 2 is first controlled to increase the output voltage VB and, after that, the series regulators 3b and 3c are controlled to increase the output voltages VC1 and VC2 to the predetermined voltage values. With such a structure, the DC stabilized power supply apparatus can achieve a high efficiency of the power source while reducing electric noises and ripples in the output voltage. Further, the DC stabilized power supply apparatus can stably change the output voltage in response to operational conditions of the load circuit connected thereto, without casing a sudden and excessive change in the output voltage.

Figure 1:
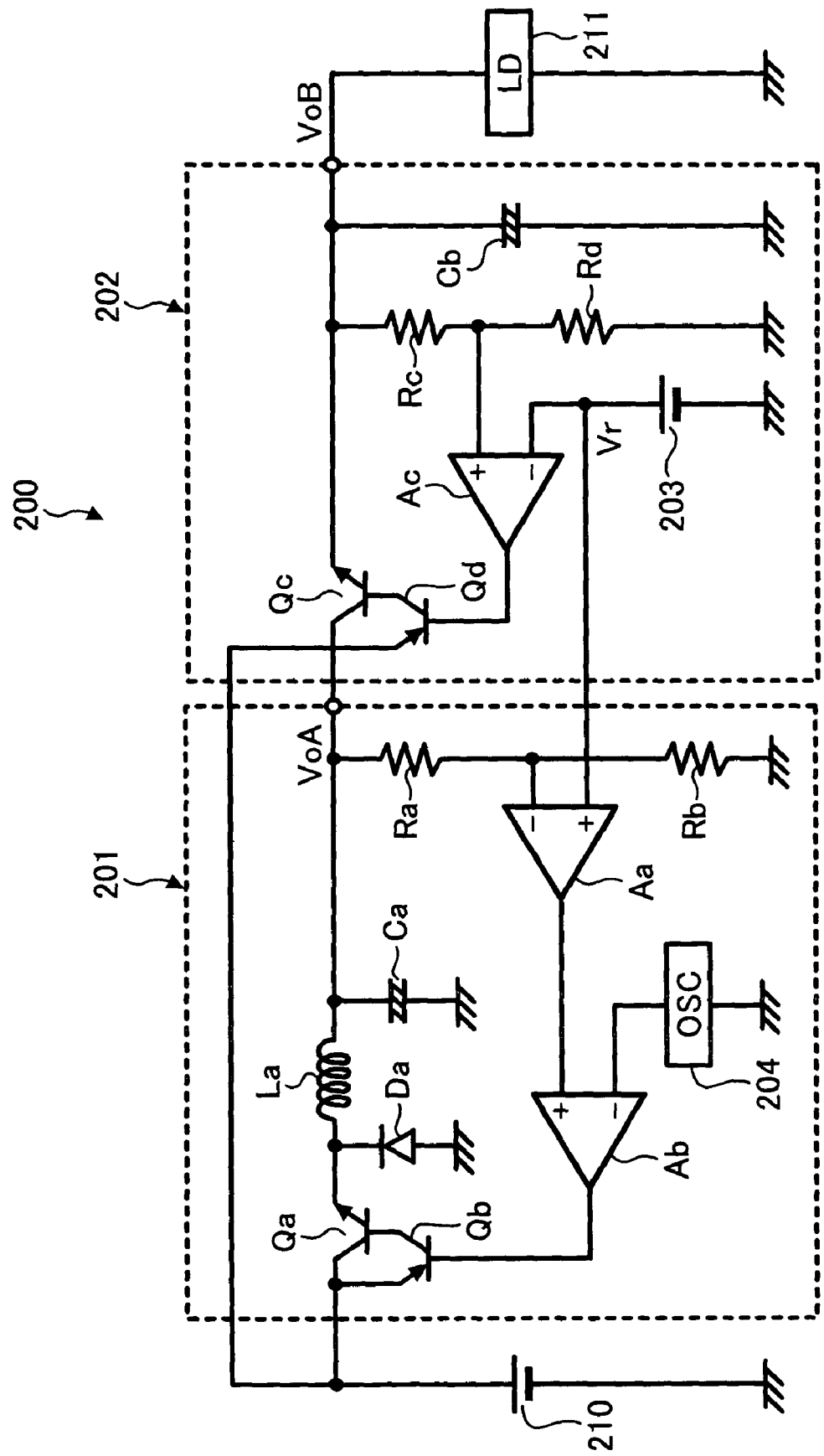
FIG. 1 is a schematic block diagram of a background DC stabilized power supply apparatus.
Figure 22:
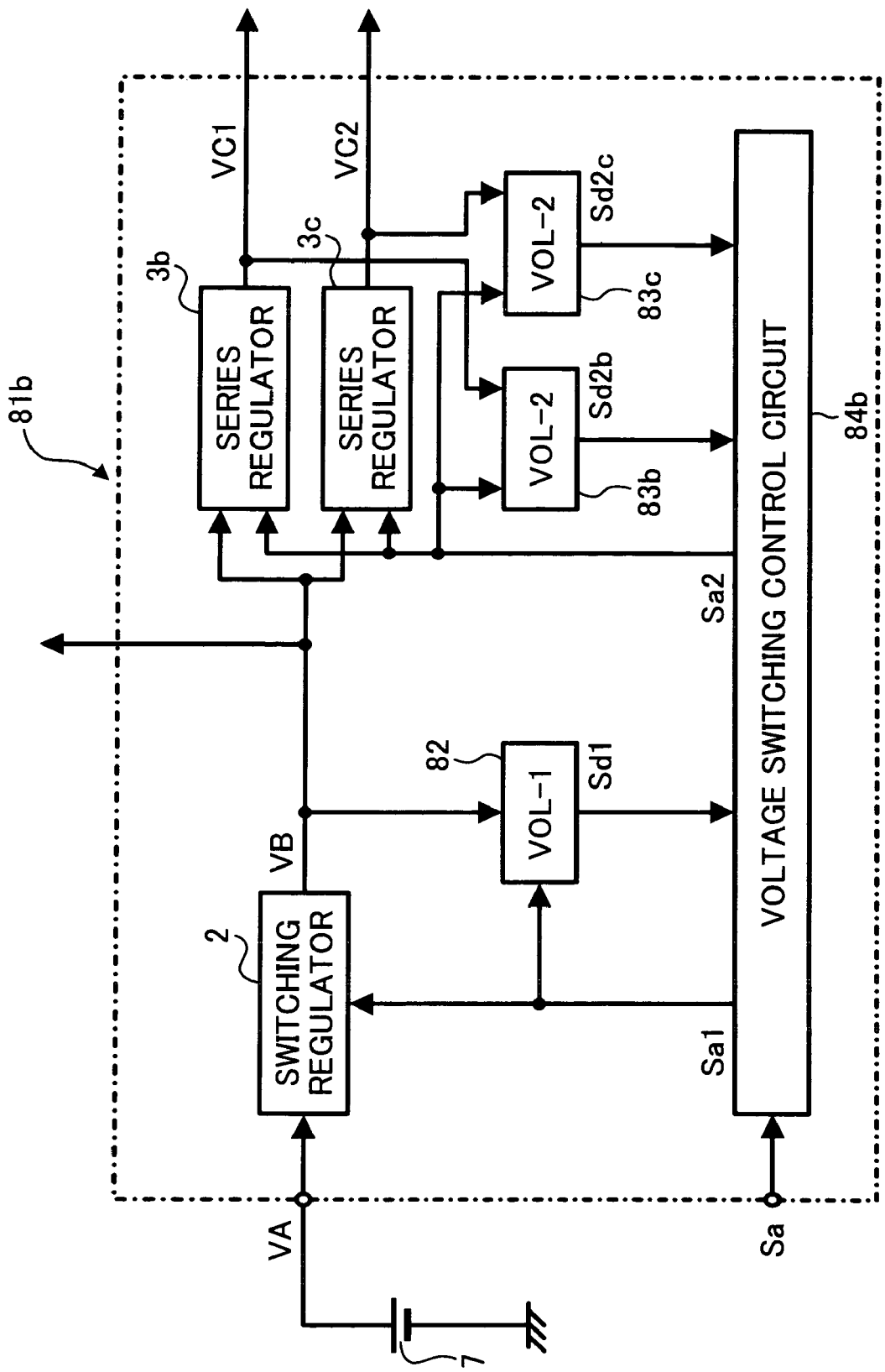

Next, a DC stabilized power supply apparatus 81b according to another preferred embodiment is explained with reference to FIG. 22. The DC stabilized power supply apparatus 81b of FIG. 22 is made based on the DC stabilized power supply apparatuses 81 of FIG. 14 and 1b of FIG. 21, and the components remaining identical are labeled with the same reference numerals in FIG. 22. The discussion below focuses portions of the DC stabilized power supply apparatus 81b different from the DC stabilized power supply apparatuses 81 and 1b, and the description for the portions identical to one another are omitted.

As shown in FIG. 22, the DC stabilized power supply apparatus 81b includes the switching regulator 2, the series regulators 3b and 3c, the first voltage detection circuit (VOL-1) 82, second voltage detection circuits (VOL-2) 83b and 83c, and a voltage switching control circuit 84b. The series regulators 3b and 3c are provided to correspond to the voltage detection circuits 83b and 83c, respectively. The second voltage detection circuit 83b detects an event in that the output voltage VC1 from the series regulator 3b becomes a predetermined voltage and outputs a detection result. The second voltage detection circuit 83c detects an event in that the output voltage VC2 from the series regulator 3c becomes a predetermined voltage and outputs a detection result. The voltage switching control circuit 84b controls a time to output the voltage switching signal Sa to the switching regulator 2 and the voltage detection circuit 82 in response to the externally input voltage switching signal Sa. Also, the voltage switching control circuit 84b controls a time to output the voltage switching signal Sa to the series regulators 3b and 3c and to the second voltage detection circuits 83b and 83c in response to the externally input voltage switching signal Sa.

The voltage switching control circuit 84b controls a time to output the voltage switching signal Sa as a voltage switching signal Sa1 to the switching regulator 2 and the first voltage detection circuit 82 in accordance with the voltage switching signal Sa. Also, the voltage switching control circuit 84b controls a time to output the voltage switching signal Sa as the voltage switching signal Sa2 to the series regulators 3b and 3c and the second voltage detection circuits 83b and 83c in accordance with the voltage switching signal Sa.

The first voltage detection circuit 82 sends a voltage detection signal Sd1 representing a detection result, indicating whether or not the output voltage VB of the switching regulator 2 becomes the predetermined voltage, to the voltage switching control circuit 84b in accordance with the voltage switching signal Sa1 sent from the voltage switching control circuit 84b. The second voltage detection circuit 83b sends a voltage detection signal Sd2b representing a detection result, indicating whether or not the output voltage VC1 of the series regulator 3b becomes the predetermined voltage, to the voltage switching control circuit 84b in accordance with the voltage switching signal Sa2 sent from the voltage switching control circuit 84b. Likewise, the second voltage detection circuit 83c sends a voltage detection signal Sd2c representing a detection result, indicating whether or not the output voltage VC2 of the series regulator 3c becomes the predetermined voltage, to the voltage switching control circuit 84b in accordance with the voltage switching signal Sa2 sent from the voltage switching control circuit 84b.

When the externally input voltage switching signal Sa is changed from a low level to a high level, for example, in order to reduce the output voltages VC1 and VC2 to respective specific voltage values, the voltage switching control circuit 84b immediately raises the voltage switching signal Sa2 to be sent to the series regulators 3b and 3c and the second voltage detection circuits 83b and 83c. Accordingly, the series regulators 3b and 3c reduce the output voltages VC1 and VC2, respectively, and the second voltage detection circuits 83b and 83c monitor the output voltages VC1 and VC2, respectively. Upon a detection that the output voltage VC1 is reduced to the specific voltage value, the second voltage detection circuit 83b reduces the voltage detection signal Sd2b, sent to the voltage switching control circuit 84b, from a high level to a low level. Likewise, upon a detection that the output voltage VC2 is reduced to the specific voltage value, the second voltage detection circuit 83c reduces the voltage detection signal Sd2c, sent to the voltage switching control circuit 84b, from a high level to a low level.

The voltage switching control circuit 84b raises the voltage switching signal Sa1 from a low level to a high level when the voltage detection signals Sd2b and Sd2c are dropped from a high level to a low level. Accordingly, the switching regulator 2 reduces the output voltage VB to a specific voltage value, and the first voltage detection circuit 82 monitors the output voltage VB. Upon a detection that the output voltage VB drops to the specific voltage value, the first voltage detection circuit 82 drops the voltage detection signal Sd1, sent to the voltage switching control circuit 84b, from a high level to a low level.

By contrast, when the externally input voltage switching signal Sa is changed from a high level to a low level, for example, in order to increase the output voltages VC1 and VC2 to respective specific voltage values, the voltage switching control circuit 84b immediately decreases the voltage switching signal Sa1. Accordingly, the switching regulator 2 increases the output voltage VB, respectively, and the first voltage detection circuit 82 monitors the output voltage VB. Upon a detection that the output voltage VB is increased to the specific voltage value, the first voltage detection circuit 82 increases the voltage detection signal Sd1, sent to the voltage switching control circuit 84b, from a low level to a high level.

The voltage switching control circuit 84b decreases the voltage switching signal Sa2, sent to the series regulators 3b and 3c and the second voltage detection circuits 83b and 83c, from a high level to a low level when the voltage detection signal Sd1 is increased from a low level to a high level. Accordingly, the series regulators 3b and 3c reduce the output voltages VC1 and VC2, respectively, to respective specific voltage values, and the second voltage detection circuits 83b and 83c monitor the output voltages VC1 and VC2, respectively. Upon a detection that the output voltage VC1 is increased to the specific voltage value, the second voltage detection circuit 83b increases the voltage detection signal Sd2b, sent to the voltage switching control circuit 84b, from a low level to a high level. Likewise, upon a detection that the output voltage VC2 is increased to the specific voltage value, the second voltage detection circuit 83c increases the voltage detection signal Sd2c, sent to the voltage switching control circuit 84b, from a low level to a high level.

In the way as described above, this DC stabilized power supply apparatus has the structure in which, to decrease the output voltages VC1 and VC2 to respective predetermined voltage values, the series regulators 3b and 3c are controlled to decrease the output voltages VC1 and VC2 to the respective predetermined voltage values. Then, the second voltage detection circuits 83b and 83c are controlled to detect whether the output voltages VC1 and VC2, respectively, drop to the respective predetermined voltage values. Then, when the second voltage detection circuits 83b and 83c detect whether the output voltages VC1 and VC2, respectively, drop to the respective predetermined voltage values, the switching regulator 2 is controlled to reduce the output voltage VB.

On the other hand, to increase the output voltage values VC1 and VC2 to predetermined voltage values, the switching regulator 2 is first controlled to increase the output voltage VB. After that, the first voltage detection circuit 82 is caused to detect whether the output voltage VB increases to a desired value. When an increase of the output voltage VB to the desired value is detected by the first voltage detection circuit 82, the series regulators 3b and 3c are controlled to increase the output voltages VC1 and VC2 to the predetermined voltage values.

With such a structure including a plurality of the series regulators, the DC stabilized power supply apparatus can achieve a high efficiency of the power source while reducing electric noises and ripples in the output voltage. Further, the DC stabilized power supply apparatus can stably change the output voltage in response to operational conditions of the load circuit connected thereto, without casing a sudden and excessive change in the output voltage.

In the DC stabilized power supply apparatuses described above, the series regulators may be replaced with appropriate switching regulators.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2002-029272 filed on Feb. 6, 2002 in the Japanese Patent Office, the entire contents of which are incorporated by reference herein.

What is claimed is:

1. A DC stabilized power supply apparatus comprising:
a voltage switching control circuit configured to generate first and second voltage switching signals in accordance with at least one voltage switching signal externally input thereto;
a first power supply circuit configured to convert a power source voltage derived from a direct current power source into a first direct current voltage in accordance with the first voltage switching signal generated by the voltage switching control circuit; and
a second power supply circuit configured to convert the first direct current voltage from the first power supply circuit into a second direct current voltage in accordance with the second voltage switching signal generated by the voltage switching control circuit;
wherein the voltage switching control circuit controls the first power supply circuit to generate the first direct current voltage such that the first direct current voltage is a minimal input voltage needed for the second power supply circuit to generate the second direct current voltage,
wherein the voltage switching control circuit controls the second power supply circuit to reduce the second direct current voltage to a first specific voltage and subsequently controls the first power supply circuit to reduce the first direct current voltage to a voltage corresponding to the first specific voltage, upon a receipt of the at least one voltage switching signal externally input such that the second direct current voltage is reduced to the first specific voltage.

2. A DC stabilized power supply apparatus as defined in claim 1, wherein the voltage switching control circuit comprises:
a controller configured to generate first and second control signals in accordance with the at least one voltage switching signal externally input thereto;
a first delay circuit configured to delay the at least one voltage switching signal by a first delay time period in accordance with the first control signal generated by the controller and to output a resultant first delayed signal as the first voltage switching signal; and
a second delay circuit configured to delay the at least one voltage switching signal by a second delay time period in accordance with the second control signal generated by the controller and to output a resultant second delayed signal as the second voltage switching signal.

3. A DC stabilized power supply apparatus as defined in claim 2, wherein the controller controls the second delay circuit to output the at least one voltage switching signal as a second voltage switching signal and controls the first delay circuit to delay the at least one voltage switching signal by the first delay time period and to output a resultant signal as the first voltage switching signal upon a receipt of the at least one voltage switching signal input thereto such that the second direct current voltage is reduced to a first voltage.

4. A DC stabilized power supply apparatus comprising:
a voltage control circuit configured to generate first and second voltage switching signals in accordance with at least one voltage switching signal externally input thereto;
a first power supply circuit configured to convert a power source voltage derived from a direct current power source into a first direct current voltage in accordance with the first voltage switching signal generated by the voltage switching control circuit; and
a second power supply circuit configured to convert the first direct current voltage from the first power supply circuit into a second direct current voltage in accordance with the second voltage switching signal generated by the voltage switching control circuit;
wherein the voltage switching control circuit controls the first power supply circuit to generate the first direct current voltage such that the first direct current voltage is a minimal input voltage needed for the second power supply circuit to generate the second direct current voltage,
wherein the voltage switching control circuit controls the second power supply circuit to increase the second direct current voltage to a second specific voltage after the voltage switching control circuit controls the first power supply circuit to increase the first direct current voltage to a voltage corresponding to the second specific voltage, upon a receipt of the at least one voltage switching signal externally input such that the second direct current voltage is increased to the second specific voltage.

5. A DC stabilized power supply apparatus as claimed in claim 4, comprises:
a controller configured to generate first and second control signals in accordance with the at least one voltage switching signal externally input thereto;
a first delay circuit configured to delay the at least one voltage switching signal by a first delay time period in accordance with the first control signal generated by the controller and to output a resultant first delayed signal as the first voltage switching signal; and
a second delay circuit configured to delay the at least one voltage switching signal by a second delay time period in accordance with the second control signal generated by the controller and to output a resultant second delayed signal as the second voltage switching signal.

6. A DC stabilized power supply apparatus as defined in claim 5, wherein the controller controls the first delay circuit to output the at least one voltage switching signal as a first voltage switching signal and controls the second delay circuit to delay the at least one voltage switching signal by the second delay time period and to output a resultant signal as the second voltage switching signal, upon a receipt of the at least one voltage switching signal input thereto such that the second direct current voltage is increased to a second voltage.

7. A DC stabilized power supply apparatus comprising:
a voltage switching control circuit configured to generate first and second voltage switching signals in accordance with at least one voltage switching signal externally input thereto;
a first power supply circuit configured to convert a power source voltage derived from a direct current power source into a first direct current voltage in accordance with the first voltage switching signal generated by the voltage switching control circuit;
a second power supply circuit configured to convert the first direct current voltage from the first power supply circuit into a second direct current voltage in accordance with the second voltage switching signal generated by the voltage switching control circuit;
a first voltage detection circuit configured to detect a voltage of the first direct current voltage in response to the first voltage switching signal generated by the voltage switching control circuit and to output a first detection result to the voltage switching control circuit; and
a second voltage detection circuit configured to detect a voltage of the second direct current voltage in response to the second voltage switching signal generated by the voltage switching control circuit and to output a second detection result to the voltage switching control circuit,
wherein the voltage switching control circuit controls the first power supply circuit to generate the first direct current voltage such that the first direct current voltage is a minimal input voltage needed for the second power supply circuit to generate the second direct current voltage,
wherein the voltage switching control circuit controls the second power supply circuit to reduce the second direct current voltage to a first arbitrary voltage and, when the second direct current voltage is detected as being reduced to the first arbitrary voltage based on the second detection result from the second voltage detection circuit, the voltage switching control circuit controls the first power supply circuit to reduce the first direct current voltage to a voltage corresponding to the first arbitrary voltage, upon a receipt of the at least one voltage switching signal externally input such that the second direct current voltage is reduced to the first arbitrary voltage.

8. A DC stabilized power supply apparatus comprising:
a voltage switching control circuit configured to generate first and second voltage switching signals in accordance with at least one voltage switching signal externally input thereto;
a first power supply circuit configured to convert a power source voltage derived from a direct current power source into a first direct current voltage in accordance with the first voltage switching signal generated by the voltage switching control circuit;
a second power supply circuit configured to convert the first direct current voltage from the first power supply circuit into a second direct current voltage in accordance with the second voltage switching signal generated by the voltage switching control circuit;
a first voltage detection circuit configured to detect a voltage of the first direct current voltage in response to the first voltage switching signal generated by the voltage switching control circuit and to output a first detection result to the voltage switching control circuit; and
a second voltage detection circuit configured to detect a voltage of the second direct current voltage in response to the second voltage switching signal generated by the voltage switching control circuit and to output a second detection result to the voltage switching control circuit,
wherein the voltage switching control circuit controls the first power supply circuit to generate the first direct current voltage such that the first direct current voltage is a minimal input voltage needed for the second power supply circuit to generate the second direct current voltage,
wherein the voltage switching control circuit controls the first power supply circuit to increase the first direct current voltage to a voltage corresponding to a second arbitrary voltage and, when the first direct current voltage is detected as being increased to the voltage corresponding to the second arbitrary voltage based on the first detection result from the first voltage detection circuit, the voltage switching control circuit controls the second power supply circuit to increase the second direct current voltage to a voltage corresponding to the second arbitrary voltage, upon a receipt of the at least one voltage switching signal externally input such that the second direct current voltage is increased to the second arbitrary voltage.

9. A DC stabilized power supply apparatus comprising:
voltage switching controlling means for generating first and second voltage switching signals in accordance with at least one voltage switching signal externally input thereto;
first power supplying means for converting power source voltage derived from a direct current power source into a first direct current voltage in accordance with the first voltage switching signal generated by the voltage switching controlling means; and
second power supplying means for converting the first direct current voltage from the first power supplying means into a second direct current voltage in accordance with the second voltage switching signal generated by the voltage switching controlling means;
wherein the voltage switching controlling means controls the first power supuying means to generate the first direct current voltage such that the first direct current voltage is a minimal input voltage needed for the second power supplying means to generate the second direct current voltage,
wherein the voltage switching controlling means controls the second power supplying means to reduce the second direct current voltage to a first specific voltage and subsequently controls the first power supplying means to reduce the first direct current voltage to a voltage corresponding to the first specific voltage, upon a receipt of the at least one voltage switching signal externally input such that the second direct current voltage is reduced to the first specific voltage.

10. A DC stabilized power supply apparatus as defingd in claim 9, wherein the voltage switching controlling means comprises:
controlling means for generating first and second control signals in accordance with the at least one voltage switching signal externally input thereto;
first delaying means for delaying the at least one voltage switching signal by a first delay time period in accordance with the first control signal generated by the controlling means and to output a first resultant delayed signal as the first voltage switching signal; and
second delaying means for delaying the at least one voltage switching signal by a second delay time period in accordance with the second control signal generated by the controlling means and to output a second resultant delayed signal as the second voltage switching signal.

11. A DC stabilized power supply apparatus as defingd in claim 10, wherein the controlling means controls the second delaying means to output the at least one voltage switching signal as a second voltage switching signal and controls the first delaying means to delay the at least one voltage switching signal by the first delay time period and to output a resultant signal as the first voltage switching signal, upon a receipt of the at least one voltage switching signal input thereto such that the second direct current voltage is reduced to a first voltage.

12. A DC stabilized power supply apparatus comprising:
voltage switching controlling means for generating first and second voltage switching signals in accordance with at least one voltage switching signal externally input thereto;
first power supplying means for converting a power source voltage derived from a direct current power source into a first direct current voltage in accordance with the first voltage switching signal generated by the voltage switching controlling means; and
second power supplying means for converting the first direct current voltage from the first power supplying means into a second direct current voltage in accordance with the second voltage switching signal generated by the voltage switching controlling means;
wherein the voltage switching controlling means controls the first power supplying means to generate the first direct current voltage such that the first direct current voltage is a minimal input voltage needed for the second power supplying means to generate the second direct current voltage,
wherein the voltage switching controlling means controls the second power supplying means to increase the second direct current voltage to a second specific voltage after the voltage switching controlling means controls the first power supplying means to increase the first direct current voltage to a voltage corresponding to the second specific voltage, upon a receipt of the at least one voltage switching signal externally input such that the second direct current voltage is increased to the second specific voltage.

13. A DC stabilized power supply apparatus as claimed in claim 12, wherein the voltage switching controlling means comprises:
controlling means for generating first and second control signals in accordance with the at least one voltage switching signal externally input thereto;
first delaying means for delaying the at least one voltage switching signal by a first delay time period in accordance with the first control siaial generated by the controlling means and to output a first resultant delayed signal as the first voltage switching signal; and
second delaying means for delaying the at least one voltage switching signal by a second delay time period in accordance with the second control signal generated by the controlling means and to output a second resultant delayed signal as the second voltage switching signal.

14. A DC stabilized power supply apparatus as defined in claim 13, wherein the controlling means controls the first delaying means to output the at least one voltage switching signal as a first voltage switching signal and controls the second delaying means to delay the at least one voltage switching signal by the second delay time period and to output a resultant signal as the second voltage switching signal, upon a receipt of the at least one voltage switching signal input thereto such that the second direct current voltage is increased to a second voltage.

15. A DC stabilized power supply apparatus comprising:
voltage switching controlling means for generating first and second voltage switching signals in accordance with at least one voltage switching signal externally input thereto;
first power supplying means for convening a power source voltage derived from a direct current power source into a first direct current voltage in accordance with the first voltage switching signal generated by the voltage switching controlling means;

second power supplying means for converting direct current voltage from the first power supplying means into a second direct current voltage in accordance with the second voltage switching signal generated by the voltage switching controlling means;

first voltage detecting means for detecting a voltage of the first direct current voltage in response to the first voltage switching signal generated by the voltage switching controlling means and to output a first detection result to the voltage switching controlling means; and second voltage detecting means for detecting a voltage of the second direct current voltage in response to the second voltage switching signal generated by the voltage switching controlling means and to output a second detection result to the voltage switching controlling means, wherein the voltage switching controlling means controls the first power supplying means to generate the first direct current voltage such that the first direct current voltage is a minimal input voltage needed for the second power supplying means to generate the second direct current voltage, wherein the voltage switching controlling means controls the second power supplying means to reduce the second direct current voltage to a first arbitrary voltage and, when the second direct current voltage is detected as being reduced to the first arbitrary voltage based on the second detection result from the second voltage detecting means, the voltage switching controlling means controls the first power supplying means to reduce the first direct current voltage to a voltage corresponding to the first arbitrary voltage, upon a receipt of the at least one voltage swiiching signal externally input such that the second direct current voltage is reduced to the first arbitrary voltage.

16. A DC stabilized power supply apparatus comprising:

voltage switching controlling means for generating first and second voltage switching signals in accordance with at least one voltage switching signal externally input thereto;

first power supplying means for converting a power source voltage derived from a direct current power source into a first direct current voltage in accordance with the first voltage switching signal generated by the voltage switching controlling means;

second power supplying means for converting the first direct current voltage from the first power supplying means into a second direct current voltage in accordance with the second voltage switching signal generated by the voltage switching controlling means;

first voltage detecting means for detecting a voltage of the first direct current voltage in response to the first voltage switching signal generated by the voltage switching controlling means and to output a first detection result to the voltage switching controlling means; and second voltage detecting means for detecting a voltage of the second direct current voltage in response to the second voltage switching signal generated by the voltage switching controlling means and to output a second detection result to the voltage switching controlling means, wherein the voltage switching controlling means controls the first power supplying means to generate the first direct current voltage such that the first direct current voltage is a minimal input voltage needed for the second power supolving means to generate he second direct current voltage, wherein the voltage switching controlling means controls the first power supplying means to increase the first direct current voltage to a voltage corresponding to a second arbitrary voltage and, when the first direct current voltage is detected as being increased to the voltage corresponding to the second arbitrary voltage based on the first detection result from the first voltage detecting means, the voltage switching controlling means controls the second power supplying means to increase the second direct current voltage to a voltage corresponding to the second arbitrary voltage, upon a receipt of the at least one voltage switching signal externally input such that the second direct current voltage is increased to the second arbitrary voltage.

17. A method of generating DC stabilized power, comprising the steps of:

(a) making first and second voltage switching signals in accordance with at least one voltage switching SLRTIEI externally input;

(b) generating a first direct current voltage based on a power source voltage derived from a direct current power source in accordance with the first voltage switching signal; and (c) producing a second direct current voltage based on the first direct current voltage in accordance with the second voltage switching signal;

wherein the first direct current voltage is a minimal input voltage for producing the second direct current voltage; and (d) when the at least one voltage switching signal is externally input such that the second direct current voltage is increased to a second specific voltage, increasing the second direct current voltage to the second specific voltage increasing the first direct current voltage to a voltage corresponding to the second specific voltage.

18. A method of generating DC stabilized power as defined in claim 17, further comprising:

creating first and second control signals in accordance with the at least one voltage switching signal;

delaying the at least one voltage switching signal by a first delay time period in accordance with the first control signal to output a first resultant delayed signal as the first voltage switching signal; and delaying the at least one voltage switching signal by a second delay time period in accordance with the second control signal to output a second resultant delayed signal as the second voltage switching signal.

19. A method as defined in claim 18, further comprising:

when the at least one voltage switching signal is input such that the second direct current voltage is increased to a second voltage, outputting the at least one voltage switching signal as a first voltage switching signal, delaying the at least one voltage switching signal by the second delay time period and outputting a resultant signal as the second voltage switching signal.

20. A method of generating DC stabilized power, comprising the steps of:

(a) generating first and second voltage switching signals in accordance with at least one voltage switching signal externally input;

(b) generating a first direct current voltage based on a power source voltage derived from a direct current power source in accordance with the first voltage switching; and (c) producing a second direct current voltage based on the first direct current voltage in accordance with the second voltage switching signal;

wherein the first direct current voltage is a minimal input voltage for producing the second direct current voltage; and (d) when the at least one voltage switching signal is externally input such that the second direct current voltage is reduced to a first specific voltage, reducing the second direct current voltage to the first specific voltage and subsequently reducing the first direct current voltage to a voltage corresponding to the first specific voltage.

21. A method as defingd in claim 20, further comprising:
creating first and second control signals in accordance with the at least one voltage switching signal;
delaying the at least one voltage switching signal by a first delay time period in accordance with the first control signal to output a first resultant delayed signal as the first voltage switching signal; and
delaying the at least one voltage switching signal by a second delay time period in accordance with the second control signal to output a second resultant delayed signal as the second voltage switching signal.

22. A method as defingd in claim 21, further comprising:
when the at least one voltage switching signal is input such that the second direct current voltage is reduced to a first voltage, outputting the at least one voltage switching signal as a second voltage switching signal, delaying the at least one voltage switching signal by the first delay time period and outputting a resultant signal as the first voltage switching signal.

23. A method of generaring a DC stabilized power, comiprising the steps of:
(a) making first and second voltage switching signals in accordance with at least one voltage switching signal externally input;
(b) generating a first direct current voltage based on a power source voltage derived From a direct current power source in accordance with the first voltage switching signal;
(c) producing a second direct current voltage based on the first direct current voltage in accordance with the second voltage switching signal;
(d) detecting a voltage of the first direct current voltage in response to the first voltage switching signal;
(e) detecting a voltage of the second direct current voltage in response to the second voltage switching signal,
wherein the first direct current voltage is a minimal input voltage needed to generate the second direct current voltage in (c); and
(f) when the at least one voltage switching signal is, input such that the second direct current voltage is reduced to the first arbitrary voltage, reducing the second direct current voltage to a first arbitrary voltage and, when the second direct current voltage is detected as being reduced to the first arbitrary voltage based on the detection result in (e), reducing the first direct current voltage to a voltage corresponding to the first arbitrary voltage.

24. A method of generating a DC stabilized power, comprising the steps of:
(a) making first and second voltage switching signals in accordance with at least one voltage switching signal;
(b) generating a first direct current voltage based on a power source voltage derived from a direct current power source in accordance with the first voltage switching signal;
(c) producing a second direct current voltage based on the first direct current voltage in accordance with the second voltage switching signal;
(d) detecting a voltage of the first direct current voltage in response to the first voltage switching signal; and
(e) detecting a voltage of the second direct current voltage in response to the second voltage switching signal,
wherein the first direct current voltage is a minimal input voltage needed to generate the second direct current voltage in (c); and
(f) when the at least one voltage switching signal is input such that the second direct current voltage is increased to the second arbitrary voltage, increasing the first direct current voltage to a voltage corresponding to a second arbitrary voltage and, when the first direct current voltage is detected as being increased to the voltage corresponding to the second arbitrary voltage based on the detection result in (d), increasing the second direct current voltage to a voltage corresponding to the second arbitrary voltage.

* * * * *